United States Patent
Morikawa et al.

[11] Patent Number: 5,685,405
[45] Date of Patent: Nov. 11, 1997

[54] MECHANICAL SHIFT LOCK APPARATUS, AND LOCK MECHANISM AND WIRE STRUCTURE FOR MECHANICAL SHIFT LOCK

[75] Inventors: Minoru Morikawa; Masaki Fujita; Yasushi Kunieda; Yoshitaka Watanabe; Shoichi Harada, all of Aichi-ken, Japan

[73] Assignee: Kabushiki Kaisha Tokai-Rika-Denki-Seisakusho, Aichi-ken, Japan

[21] Appl. No.: 496,402

[22] Filed: Jun. 29, 1995

[30] Foreign Application Priority Data

| Jun. 30, 1994 | [JP] | Japan | 6-149132 |
| Nov. 7, 1994 | [JP] | Japan | 6-272313 |
| Nov. 25, 1994 | [JP] | Japan | 6-291819 |
| May 24, 1995 | [JP] | Japan | 7-124773 |
| May 24, 1995 | [JP] | Japan | 7-125379 |

[51] Int. Cl.⁶ .................................................. B60K 41/28
[52] U.S. Cl. .................... 192/4 A; 70/245; 74/483 R; 477/96
[58] Field of Search .............. 192/4 A; 74/483 R; 477/96, 99; 70/245, 251, 247, 248

[56] References Cited

U.S. PATENT DOCUMENTS

| 4,474,085 | 10/1984 | DeVogelaere et al. | 70/248 X |
| 4,905,802 | 3/1990 | Gotoh | 192/4 A |
| 4,932,493 | 6/1990 | Sakurai et al. | 192/4 X |
| 4,936,431 | 6/1990 | Shinpo | 192/4 A |
| 4,991,700 | 2/1991 | Koga | 192/4 A |
| 5,014,831 | 5/1991 | Wawra et al. | 192/4 A |
| 5,031,737 | 7/1991 | Dzioba et al. | |
| 5,058,462 | 10/1991 | Killiany et al. | |
| 5,078,242 | 1/1992 | Ratke et al. | 192/4 A |
| 5,489,246 | 2/1996 | Moody et al. | 477/96 |

FOREIGN PATENT DOCUMENTS

| 0315174 | 5/1989 | European Pat. Off. |
| 0373368 | 11/1989 | European Pat. Off. |
| 4337524 | 5/1994 | Germany |
| 6249227 | 9/1994 | Japan |

*Primary Examiner*—Rodney H. Bonck
*Attorney, Agent, or Firm*—Sixbey Friedman Leedom & Ferguson; Thomas W. Cole

[57] ABSTRACT

A shift lock apparatus which allows a shift interlock wire and a key interlock wire to be arranged more effectively and neatly within the vehicle body. A lock pin engages with a first engagement portion perpendicularly each other. The shift interlock wire is linked with the first engagement portion and moves as a shift lever is locked or unlocked. The lock pin is moved by a brake pedal when the brake pedal is released. When a key inserted into a key cylinder is rotated from an ACC position to a LOCK position, the key interlock wire moves to establish engagement with a second engagement portion. Both wires intersect each other, and also the lock pin and the wire intersect each other, thereby providing secure operation and a shorter and neater layout of wires when a housing is installed within the interior of the vehicle.

15 Claims, 31 Drawing Sheets

MECHANICAL SHIFT LOCK APPARATUS, AND LOCK MECHANISM AND WIRE STRUCTURE FOR MECHANICAL SHIFT LOCK

BACKGROUND OF THE INVENTION

1. Field of the Invention

The present invention relates to a mechanical shift lock apparatus used for restricting shift operation of a shift lever in an automatic transmission of an automobile and the like and a lock mechanism and a wire structure for mechanical shift lock.

2. Description of the Related Art

A mechanical shift lock apparatus has a lock mechanism to mechanically lock a shift lever which is positioned at a parking range. Various lock mechanisms of this kind are available. For example, a lock pin biased by a spring engages a cut portion provided in a shift lever at the base portion thereof. This engagement is automatically established by the spring when the shift lever is positioned at the parking range.

Also, various unlocking methods are used for the lock mechanism. For example, when a brake pedal is stepped on, a wire is pulled to move a lock cam thereby to move a lock pin to its unlock position (brake interlock type). Alternatively, a key inserted into a key cylinder is rotated from a LOCK position to an ACC position to pull a wire thereby to move a lock cam for moving a lock pin to its unlock position (key interlock type).

In addition, a lock mechanism which provides both the function of a brake interlock type mechanism and the function of a key interlock type mechanism (brake-key interlock type) is also available. For example, a brake interlock wire and a key interlock wire are run in parallel with each other, and a link member is provided at the parallel run portion of the wires so that a shift lever is unlocked only when a brake pedal is stepped on and a key is rotated from the LOCK position to the ACC position. Thus, the shift lever cannot be shifted from the parking range to another range without stepping on the brake pedal or with the key being held at the LOCK position.

However, in the brake-key interlock type, the brake interlock wire and the key interlock wire are run in parallel with each other, and a link member must be provided to establish an interlocking relation between the wires. This causes the number of parts to increase for secure interlock. Also, the parallel run of the wires causes difficulty in disposing the wires within the vehicle body.

Also, in addition to electric switches such as a brake lamp switch, the interlock members for the lock mechanism must be installed in a narrow space around the brake pedal. As a result, the structure of the lock mechanism becomes complex due to the necessity of many component parts, and installation and adjustment work becomes troublesome with a resultant increase in costs.

In the brake-key interlock type mechanical shift lock apparatus, as shown in FIG. 30, when a shift lever knob 302 of a shift lever 300 is pressed, a detent pin 304 is pressed in the downward direction in FIG. 30. In this state, as the shift lever 300 rotates about its axis of rotation, the detent pin 304 changes its position of engagement with a detent groove 308 in a detent plate 306 thereby to allow the shift lever 300 to shift to a P (parking) range, an R range, an N range, or a D range. A lock cam 310 which is rotatable about a pivot 314 is provided near the detent pin 304 and receives the detent pin 304 into a U-shaped groove 312 therein when the shift lever 300 is positioned at the P range. When the shift lever 300 is positioned at the P range illustrated in FIG. 30, the lock cam 310 rotates in the direction of arrow L to the illustrated position (lock position) of FIG. 30 and is locked there. Thus, the detent pin 304 is prevented from moving in the direction of slipping out of the detent groove for the P range (in the downward direction in FIG. 30). As a result, the shift lever 300 cannot shift from the P range to another range unless the lock cam 310 rotates in the direction opposite to the direction of arrow L in FIG. 30 to a position (unlock position) where the detent pin 304 can slip out of the U-shaped groove 312. The lock cam 310 rotates between its lock or unlock position in an interlocking relation with the movement of an inner wire 316 of a shift interlock wire 315, the inner wire 316 being connected to the lock cam 310.

The other end of the inner wire 316 is connected to a shift unlock apparatus (not shown) interlocked with a brake pedal. The inner wire 316 is sheathed with an outer sheath 318. A mounting metal piece 320 is fixed to an end of the outer sheath 318. The mounting piece 320 has a larger-diameter portion fixed to the outer sheath 318 and a smaller-diameter portion extending from the larger-diameter portion. External threads 322 are formed at the small-diameter portion of the mounting piece 320. Two nuts 324 are screw-engaged with the external threads 322. The smaller-diameter portion having the external threads 322 is inserted into a groove 328 formed in a plate 326 mounted on an unillustrated chassis, and the plate 326 is clamped between the two nuts 324, thereby fixing the end of the outer sheath 318 to the plate 326.

A mounting metal piece 332 with an engagement opening 330 being formed therein is fixed to an end of the inner wire 316. A pin 334 standing on the lock cam 310 is inserted into the engagement opening 330 for engagement.

In some brake-key interlock type mechanical shift lock apparatus, a slide member having a square cross section is caulked to an end of a wire connected to a lock cam. The slide member is supported in a housing so as to be slidable in a longitudinal direction thereof and has a groove formed in a longitudinally intermediate portion thereof. A lock member is provided in the housing. The lock member slides perpendicularly to the sliding direction of the slide member in dependence on a key operation. The lock member is adapted to fit into the cut in the slide member, thereby locking the slide member.

The position of the detent pin 304 shown in FIG. 30 varies slightly (0.2 to 0.5 mm for example) depending on vehicles due to the dimensional tolerance of the shift unlock apparatus and other parts. Since distance L2 between the pivot 314 and the pin 334 is greater than distance L1 between the pivot 314 and the detent pin 304, even when a small positional error exists in the position of the detent pin 304, the positional error is transmitted to the side where the wire is located after being magnified at a lever ratio (L2/L1>1). This results in a great change in the distance between the groove 328 of the plate 326 and the pin 334 of the lock cam 310. Thus, the position of the mounting metal piece 320 attached to the plate 326 must be adjusted in an axial direction by turning the two nuts 324 for proper attachment of the shift interlock wire 315. Therefore, installation work for the apparatus is complex and inefficient.

Also, when the slide member having a square cross section and a groove is caulked to the wire, the rotational phase (about the center) of the slide member supported by the housing is fixed with respect to housing (in other words, the slide member has an angular orientation with respect to the housing). Accordingly, if one end of the wire is first fixed to the lock cam, the angular or rotational phase of the wire about the axis thereof is also fixed. The slide member, therefore, must be rotated for proper attachment to the housing. Rotating the slide member leads to a twist of the wire. The twist of the wire is not desirable for installation and use. Also, it is difficult to twist the wire by a large amount.

SUMMARY OF THE INVENTION

In view of the foregoing, an object of the present invention is to provide a mechanical shift lock apparatus of the brake-key interlock type which can provide secure operation, which can reduce the number of parts and which can facilitate the installation of wires within a vehicle body.

Another object of the present invention is to provide a mechanical shift lock apparatus of the brake-key interlock type in which a member used for providing interlocking between a brake pedal and a lock mechanism is integrated with an electric switch, thereby making the lock apparatus simpler and compacter and reducing the production cost.

A further object of the present invention is to provide a mechanical shift lock apparatus and a wire structure for a mechanical shift lock apparatus which are easy to assemble.

According to a first aspect of the present invention, there is provided a mechanical shift lock apparatus used with a lock mechanism which mechanically locks a shift lever positioned at a parking range and unlocks the shift lever by a driver's special operation such as depressing of a shift lever knob button, which mechanical shift lock apparatus comprises a shift interlock wire which is moved from a locked position to an unlocked position or to the contrary as the shift lever is mechanically locked or unlocked, a break interlock member which is moved by a brake pedal, a key interlock member which is moved as a key inserted into a key cylinder is rotated from an ACC position to a LOCK position, and an engagement member connected to the shift interlock wire, in the state in which the shift interlock wire is positioned at its locked position, with which break interlock member moved by the break pedal being at a released position, intersects and engages and which allows the key interlock member moved by the key being rotated to the LOCK position to intersect and to engage therewith.

According to the first aspect, when the shift lever is locked at the parking range, the break interlock member moved by the brake pedal intersects the engagement member and holds the shift interlock wire in the locked position unless the brake pedal is stepped on. Thus, the shift lever cannot be shifted from the parking range to another range while the brake pedal is left released. Also, when the shift lever is locked at the parking range, the key interlock member intersects the engagement member and holds the shift interlock wire in the locked position unless the key inserted in the key cylinder is rotated from the LOCK position to the ACC position. Thus, the shift lever cannot be shifted from the parking range to another range while the key is held at the LOCK position. Since the break interlock member and the key interlock member intersect and engage with the engagement member, their engagement and disengagement are secure.

By providing a switching contact which is electrically connected and disconnected as the lock member moves, it is not necessary to separately provide a brake lamp switch, thereby rationalizing overall construction and installation and reducing the number of parts. When the break interlock member is composed of plural component parts, the switching contact may be turned on and off by some component parts which move in an interlocking relation with the movement of the brake pedal.

According to a second aspect of the present embodiment, there is provided a mechanical shift lock apparatus including a lock member to which an inner wire of a shift interlock wire is fixed at an inner wire engagement portion thereof and which engages with a detent pin of a shift lever to restrict movement of the shift lever. The mechanical shift lock apparatus locks the shift lever positioned at a parking range through the lock member and unlocks the shift lever positioned at the parking range in response to a driver's predetermined unlocking operation transmitted to the lock member through the inner wire. The mechanical shift lock apparatus further includes an outer sheath fixing member to which one end of the outer sheath is engaged at an outer sheath engagement portion thereof and which is adapted to adjust the distance between the inner wire engagement portion of the lock member and the outer sheath engagement portion thereof, the outer sheath sheathing the inner wire slidably.

According to the second aspect, before starting adjustment, the shift lever is shifted to the parking range to set the lock member to its lock position where movement of the shift lever can be restricted. The outer sheath fixing member is adjusted so that the distance between the inner wire engagement portion and the outer sheath engagement portion becomes equal to the distance between one end of the inner wire and one end of the outer sheath. Usually, as the position of the detent pin changes, the lock position of the lock member which engages the detent pin changes accordingly. However, since the distance between the inner wire engagement portion and the outer sheath engagement portion can be made equal to the distance between one end of the inner wire and one end of the outer sheath by adjusting the outer sheath fixing member, the inner wire and the outer sheath can be easily attached in place without making their adjustment. The lock member restricts the movement of the shift lever unless a driver performs a predetermined unlocking operation, and thus the shift lever cannot be shifted from the parking range to another range. When a driver performs a predetermined unlocking operation, it is transmitted to the lock member through the inner wire, and thus locking effected by the lock member is undone. As a result, the shift lever can be shifted from the parking range to another range.

The second aspect frees a mechanical shift lock apparatus from a troublesome adjustment of the mounting position of an outer sheath end, thereby facilitating installation work for the inner wire and the outer sheath.

DETAILED DESCRIPTION OF THE PREFERRED EMBODIMENTS

Figure 4:
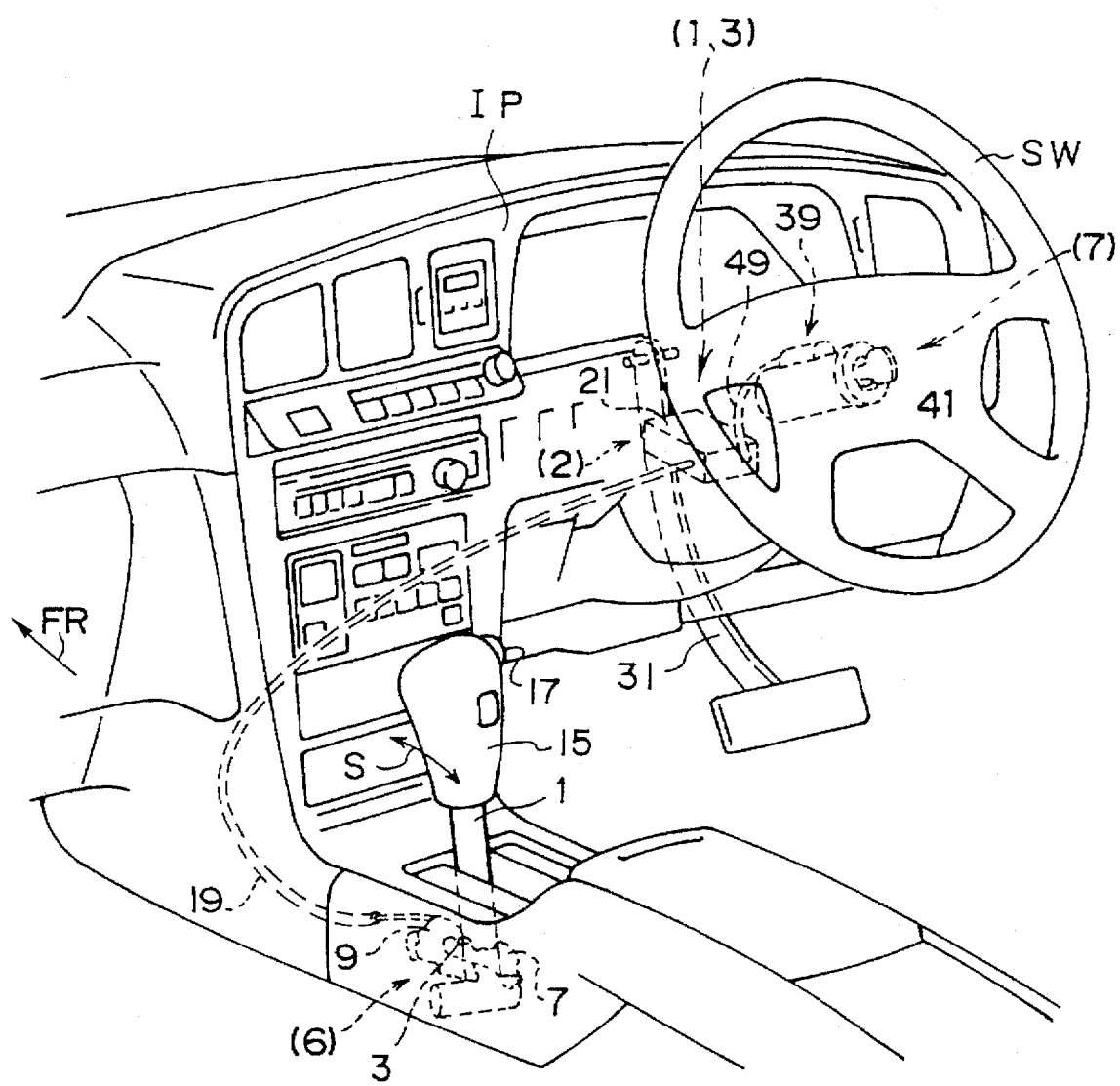
FIG. 4 is a perspective view of the inside of a vehicle showing the entire arrangement of the apparatus according to the first embodiment.
Figure 6:
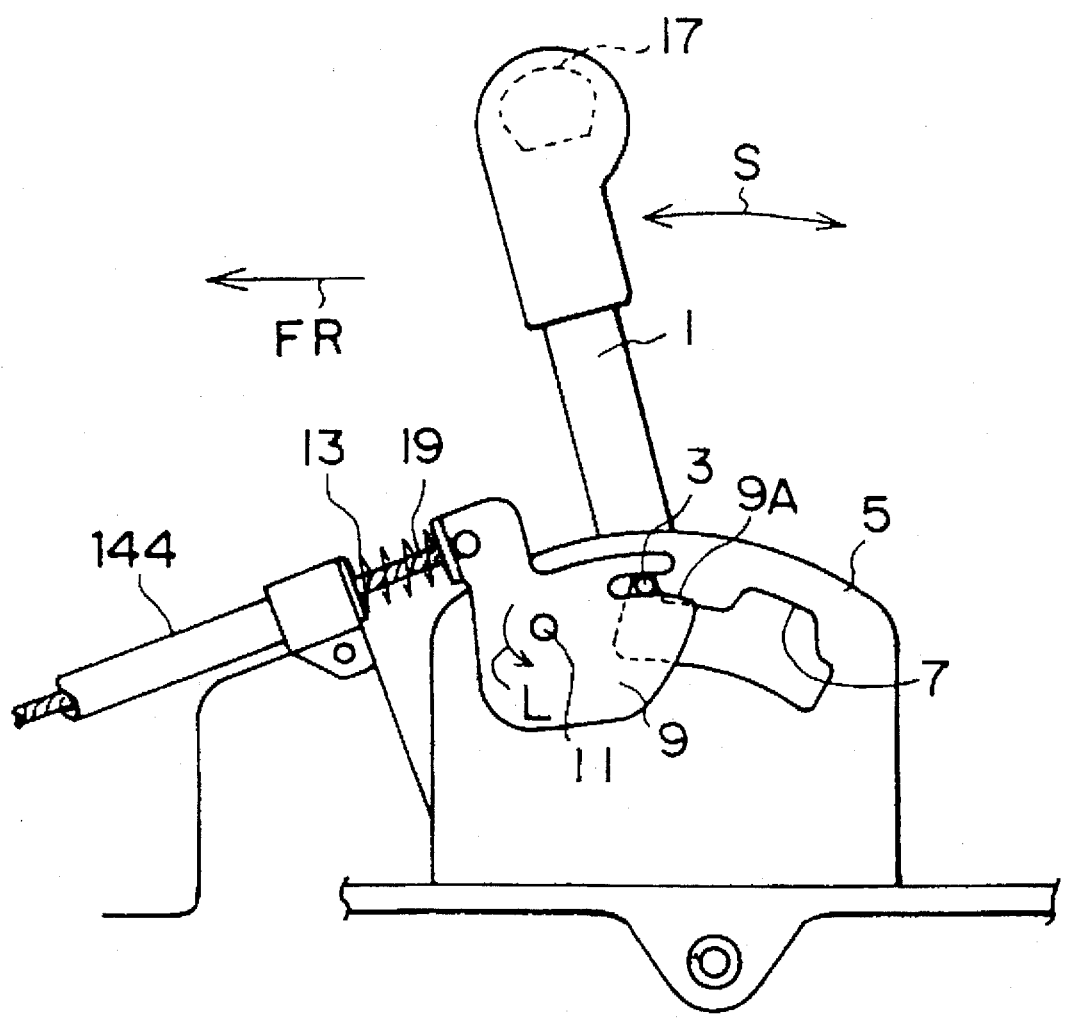
FIG. 6 is a side view of the lock mechanism of FIG. 4 in which some parts are removed.

First embodiment:

FIGS. 4 and 6 show a lock mechanism used with a mechanical shift lock apparatus according to a first embodiment of the present invention. When a shift lever knob 17 provided on a shift lever 1 is pressed, a detent pin 3 is pressed downward in FIG. 6. As the shift lever 1 swings toward the front or rear of the vehicle (in the direction of arrow S), the detent pin 3 changes its position of engagement with a detent groove 7 in a detent plate 5 to effect a shift among a P (parking) range, an R range, an N range, a D range and the like. The detent pin 3 is biased upward in FIG. 6 by a return spring, not shown. A lock cam 9 is located near the detent pin 3 and adapted to receive the detent pin 3 of the shift lever 1 located at the P range into a U-shaped groove 9A thereof. The lock cam 9 is rotatable about a pivot 11. When the shift lever 1 is positioned at the P range as shown in FIG. 6, the lock cam 9 rotates in the direction of arrow L to the illustrated position (lock position) and is fixed at that position to prevent the detent pin 3 from slipping out of a detent groove for the P range (from moving downward in FIG. 6). Accordingly, the shift lever 1 cannot shift from the P range to another range unless the lock cam 9 rotates in the direction opposite to the direction of arrow L in FIG. 6 to an unlock position to permit the detent pin 3 to slip out of the U-shaped groove 9A.

Figure 1:
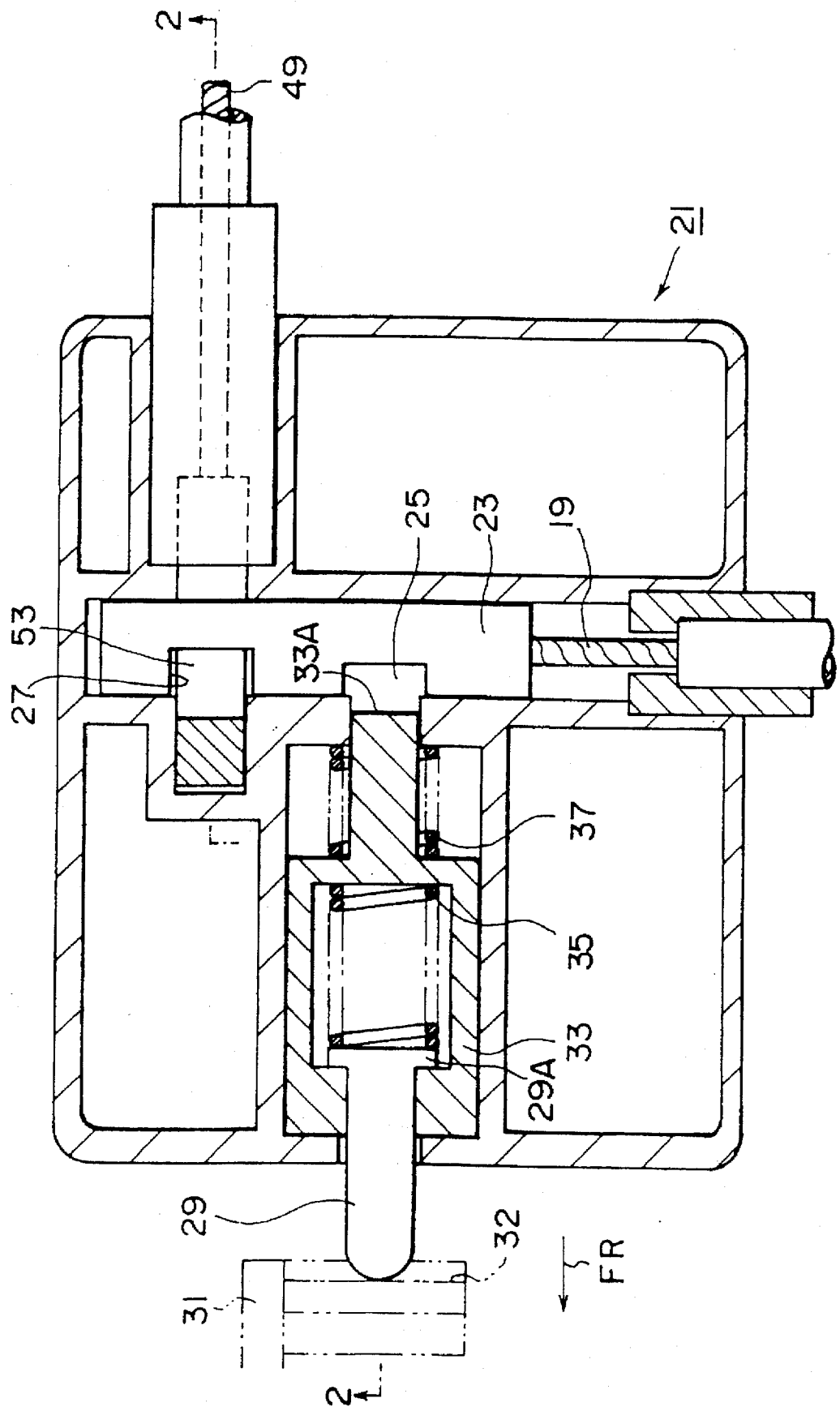
FIG. 1 is a horizontal cross-sectional view of a housing of an apparatus according to a first embodiment of the present invention.

The lock cam 9 rotates between the lock or unlock position in an interlocking relation with a shift interlock wire 19 connected to the lock cam 9. The other end of the shift interlock wire 19 is led into a housing 21 which serves as guide means for an apparatus according to the embodiment, and is connected to a first slide member 23 (see FIGS. 1 to 3) having a rectangular cross section. The first slide member 23 is supported by the housing 21 so as to be slidable in a longitudinal direction (a vertical direction in FIG. 1) and has a first engagement groove 25 and a second engagement groove 27 in a side face thereof at longitudinal intermediate positions thereof, the grooves being rectangular. In FIG. 1 showing the housing 21, arrow FR is directed to the front of a vehicle.

A slide pin 29 is provided on one side of the first slide member 23 and projects from a side face of the housing 21 toward the front of a vehicle. The slide pin 29 is provided in an opposed relation with a contact portion 32 fixed to a brake pedal 31 at an intermediate position thereof. When a driver steps on the brake pedal 31, the brake pedal moves toward the front of the vehicle, i.e. away from the slide pin 29. A part of the slide pin 29 is received in a lock pin 33 so that a flange 29A of the slide pin 29 can slide therein, and is biased by a first spring 35 in a direction of making contact with the contact portion 32. The lock pin 33 is biased against the housing 21 by a second spring 37 in the direction of making contact with the contact portion 32. The lock pin 33 and the slide pin 29 compose a lock member. The lock member can contract, but is usually biased by the first spring 35 in an expanding direction. The flange 29A of the slide pin 29 abuts on an inner wall surface of the lock pin 33 to restrict a further expansion.

Figure 3:
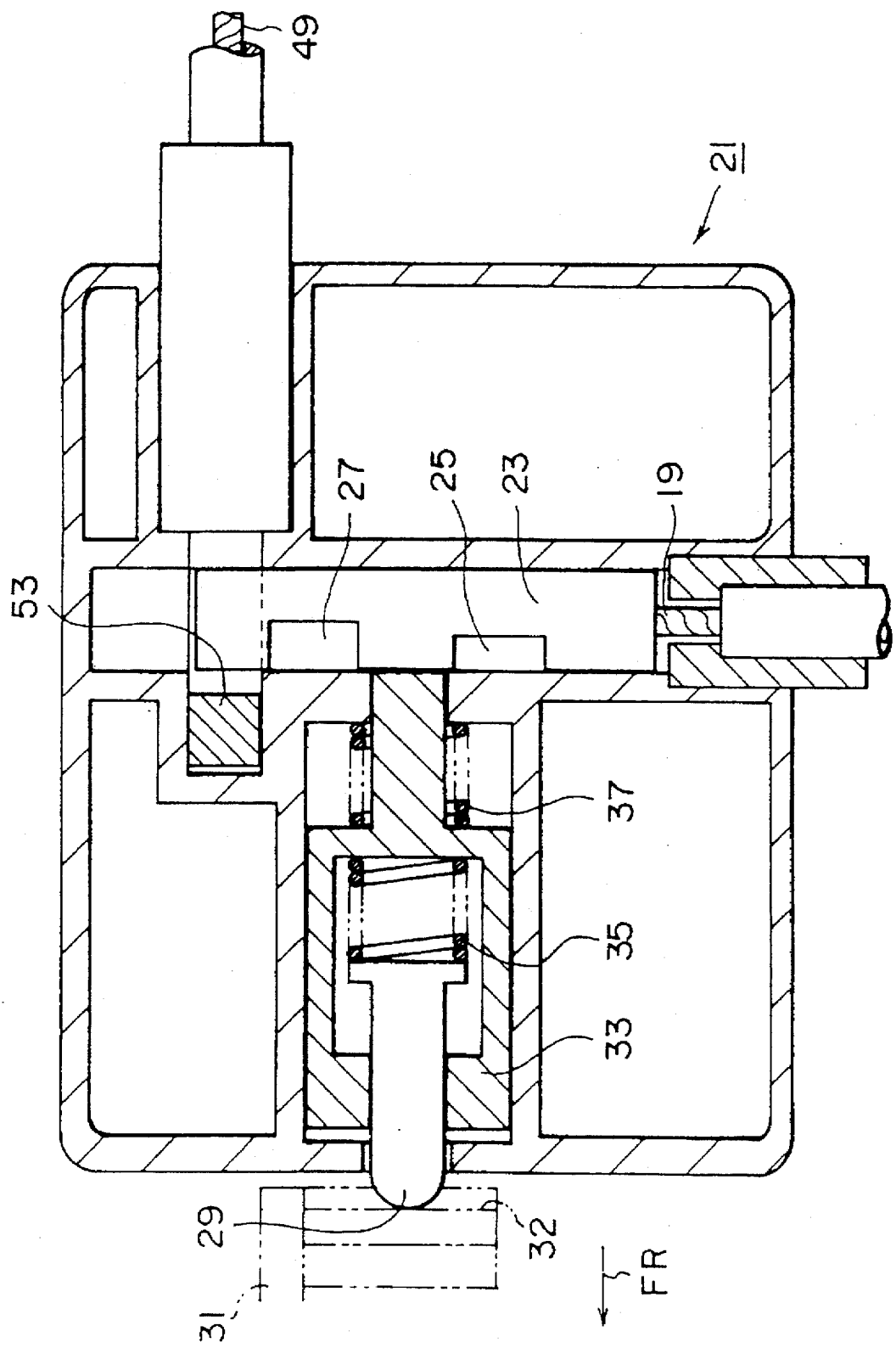
FIG. 3 is a view showing the operation of the apparatus shown in FIG. 1.

The position of the first engagement groove 25 is determined so as to effect locking as described below. When a rear end 33A of the lock pin 33 engages with the first engagement groove 25, the shift interlock wire 19 holds the lock cam 9 at the lock position shown in FIG. 6 against the force of a return spring 13 (see FIG. 6), thereby preventing the detent pin 3 from lowering from the position shown in FIG. 6 even when the shift lever knob 17 is pressed. In this locked sate, the lock pin 33 substantially intersects perpendicularly to the first slide member 23. FIG. 1 shows the first slide member 23 positioned at a lock position, and FIG. 3 shows the first slide member 23 positioned at an unlock position. When the detent pin 3 shifts to other than the P range, the return spring 13 holds the lock cam 9 at its unlock position.

The lock cam 9 shown in FIG. 6 is biased in the direction opposite to the direction of arrow L by the return spring 13. However, a return spring (not shown) of the detent pin 3 has a stronger force than the return spring 13. Therefore, when the shift lever 1 shifts to the P range, the detent pin 3 causes the lock cam 9 to rotate in the direction of arrow L to the position shown in FIG. 6 while entering the U-shaped groove 9A.

Figure 7:
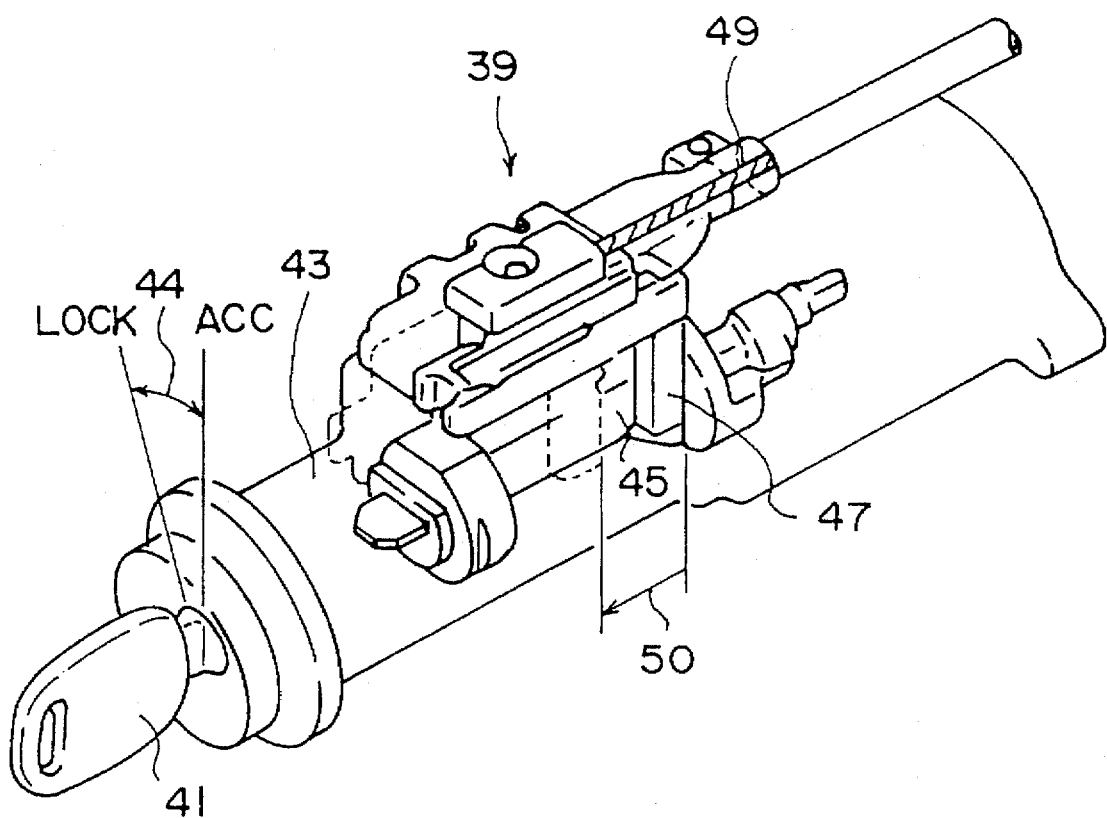
FIG. 7 is an enlarged perspective view of the key device of FIG. 4.

FIG. 7 shows a key device 39 to move a key interlock wire 49. When a key 41 inserted into a key cylinder 43 is turned from an ACC position to a LOCK position (in the direction of arrow 44 in FIG. 7), the rotation of a cam 45 is transmitted to a pin 47 to pull the key interlock wire 49 (in the direction of arrow 50 in FIG. 7).

Figure 2:
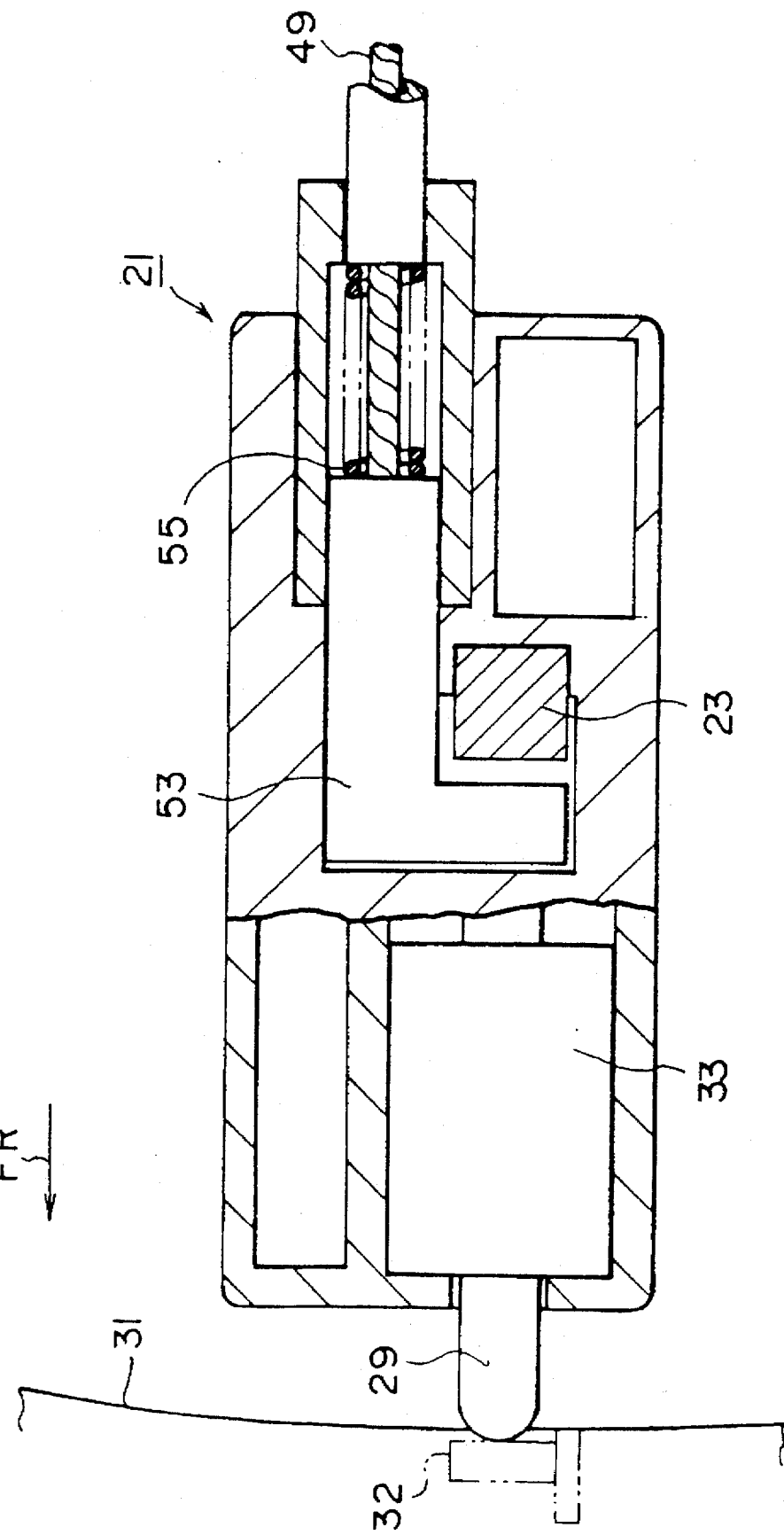
FIG. 2 is a cross-sectional view taken along line 2—2 in FIG. 1.

The other end of the key interlock wire 49 is led into the housing 21 (see FIGS. 1 to 3) and connected to a second slide member 53. The second slide member 53 has an L-shaped end (see FIG. 2). The L-shaped end 53A is as large as to engage with the second engagement groove 27 thereby to form an engagement member. The L-shaped end 53A engages with the second engagement groove 27 such that the first and second slide members 23, 53 substantially intersect perpendicularly to each other. The second engagement groove 27 is positioned such that this engagement is made only when the lock cam 9 is at its lock position. In FIG. 2, numeral 55 denotes a return spring which slides the second slide member 53 in the direction of arrow FR when the key 41 is rotated from the LOCK position to the ACC position.

The operation of the first embodiment will now be described.

In FIGS. 1, 4 and 6, the shift lever 1 is positioned at the P range, and the lock cam 9 is at its lock position. Accordingly, the shift lock wire 19 and the first slide member 23 are also at their lock position (see FIG. 1). When the vehicle is parked, the key 41 is located at the LOCK position, and hence the second slide member 53 engages with the second engagement groove 27 thereby to hold the first slide member 23 at its lock position. If the brake pedal 31 is not stepped on, the brake pedal 31 positioned at its released position, i.e. at its original position presses the slide pin 29 to the right in FIG. 1. This pressing force causes the second spring 37 to contract through the first spring 35 and the lock pin 33, and thus the lock pin 33 slides in the direction opposite to the direction of the brake pedal 31 so that the rear end of the lock pin 33 is engaged with the first engagement groove 25. As a result, even when the shift lever knob 17 is pressed, the lock cam 9 does not rotate, and hence the detent pin 3 cannot be pressed down thereby to prevent the shift lever 1 from shifting to another range.

When the shift interlock wire 19 and the first slide member 23 is at their lock position, the second slide member 53 can freely engage with or disengage from the second engagement groove 27 (see FIG. 1). Accordingly, the key 41 inserted into the key cylinder 43 can be rotated from the LOCK position to the ACC position and vice versa (see FIG. 7).

In order to shift the shift lever 1 from the P range to another range, for example to the D range, the brake pedal 31 is stepped on, and also the key 41 is rotated from the LOCK position to the ACC position (further to an engine start position as needed). This causes the lock pin 33 to disengage from the first engagement groove 25 and the second slide member 53 to disengage from the second engagement groove 27 thereby to permit the shift interlock wire 19 to become movable. Thus, the lock cam 9 becomes readily movable. Then, by pressing the shift lever knob 17, the detent pin 3 is pressed down thereby to rotate the lock cam 9 in the unlocking direction. When locking is thus undone, the shift lever 1 becomes readily shiftable to any range.

When the shift lever 1 shifts to other than the P range, the first slide member 23 moves downward as shown in FIG. 3, and thus the first and second engagement grooves 25, 27 do not engage with the lock pin 33 and the second slide member 53 any more. In this case, when the brake pedal 31 is released, the slide pin 29 slides in the direction opposite to the direction of the brake pedal 31 to compress the first spring 35. However, the lock pin 33 itself does not slide in the direction opposite to the direction of the brake pedal 31 because it does not face the engagement groove 25, and hence the second spring 37 does not compress. Also, the second slide member 53 cannot engage with the second engagement groove 27, and thus the second slide member 53 and the key interlock wire 49 cannot move to the right in FIG. 3. Accordingly, the key 41 cannot be rotated from the ACC position to the LOCK position.

When the shift lever 1 reaches the P range, the detent pin 3 rotates the lock cam 9 to its lock position by force of the return spring of the detent pin 3. Accordingly, the shift interlock wire 19 returns the first slide member 23 to its lock position shown in FIG. 1 thereby to allow the key 41 to be rotated to the LOCK position.

As has been described above, the lock pin 33 and the second slide member 53 engage with the first slide member 23 in the state of perpendicularly intersecting with the first slide member 23. Thus, the first slide member 23 and the shift interlock wire 19 can be securely locked.

According to the perpendicular engagement as described above, the shift interlock wire 19 is arranged perpendicular to the key interlock wire 49 and the lock pin 33 within the housing 21, and these components are slidable within the housing 21.

Figure 5:
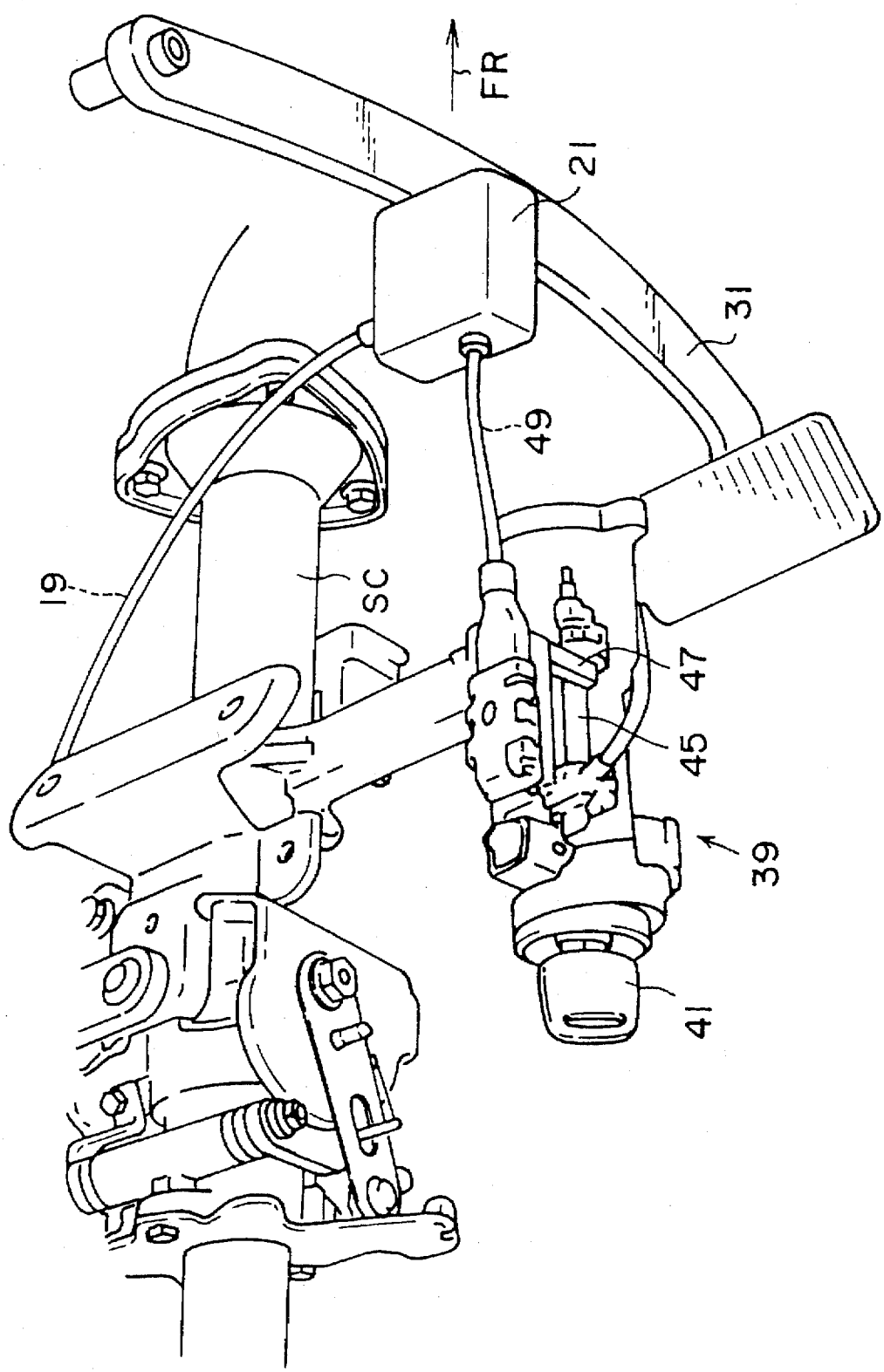
FIG. 5 is an enlarged perspective view of the essential portions of FIG. 4 in which the front portion of a vehicle is viewed from the right-hand side of the vehicle.

The housing 21 is located such that the short slide pin 29 contacts the brake pedal 31. The shift interlock wire 19 is led from a lock mechanism provided at the bottom portion of the shift lever 1 to the housing 21. Furthermore, the key interlock wire 49 is led from the key device 39 to the housing 21. In view of the positional relation among the brake pedal 31, the shift lever 1 and the key device 39, it is apparently preferable that the housing 21 be located ahead (as viewed in the front-and-rear direction of the vehicle) of an instrument panel IP, a steering wheel SW and the key device 39, behind the brake pedal 31 (as viewed in the front-and-rear direction of the vehicle), and at the side of a steering column SC, as shown in FIGS. 4 and 5. In addition, it is apparent that both wires 19, 49 running perpendicular to each other are more advantageous than conventional counterparts running in parallel with each other from the viewpoint of layout of wires within the vehicle body. The embodiment allows shorter wires to be disposed smoothly as can be understood from FIG. 5.

Since both wires 19, 49 are disposed smoothly, a force is also transmitted smoothly through the wires 19, 49 to ensure mechanical operations of the apparatus. Also, the durability of the apparatus improves. The shift interlock wire 19 starts from near the shift lever 1, extends forward within a console box, runs upward, and then bends toward the side of the vehicle to return to the housing 21.

Second embodiment:

A second embodiment of the present invention will now be described with reference to FIGS. 8 and 9. An apparatus according to the present embodiment is the same as the apparatus according to the first embodiment except that the lock pin 33 is integrated with the second slide member 53 which engages with the second engagement groove 27.

Figure 8:
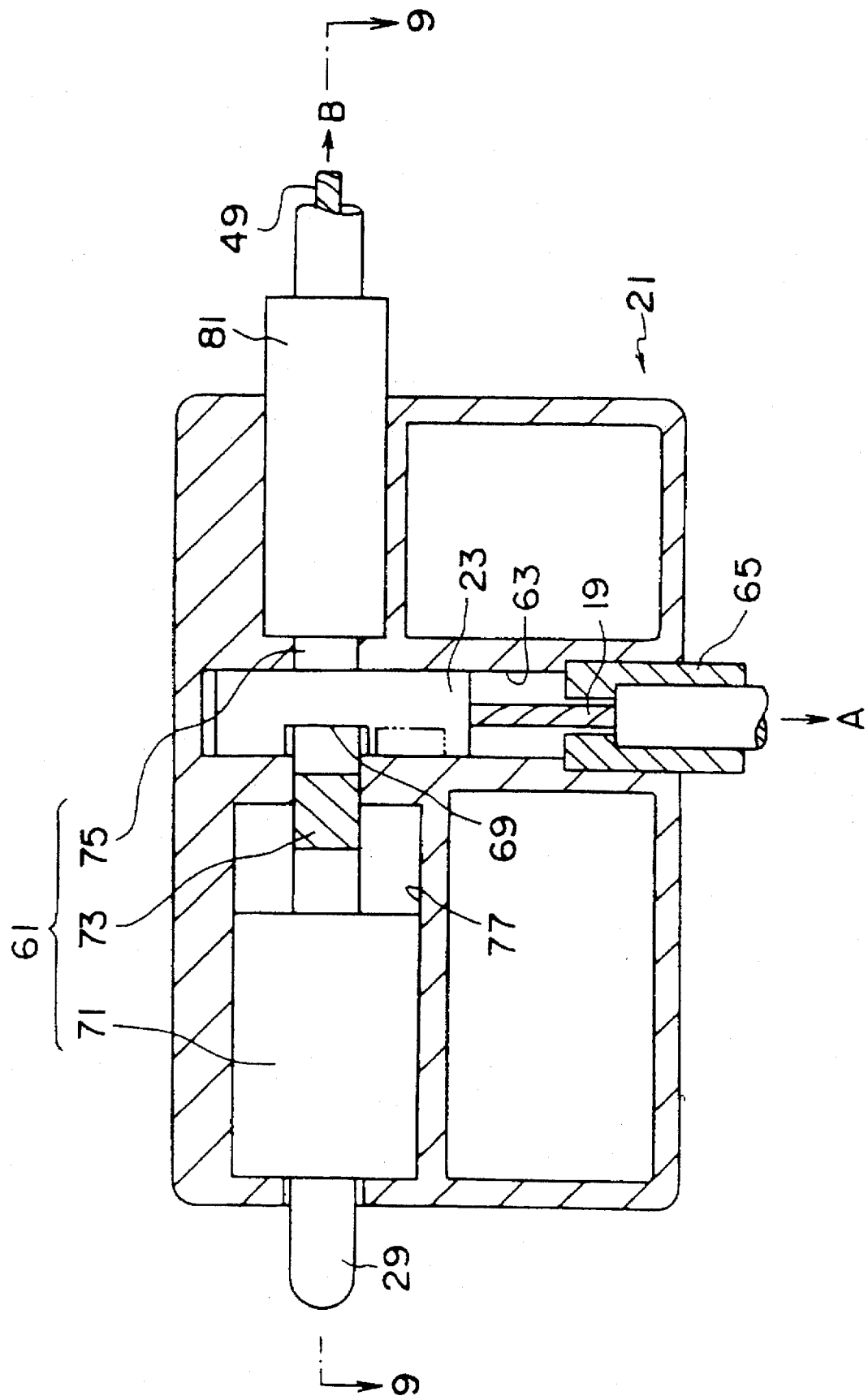
FIG. 8 is a horizontal cross-sectional view of a housing of an apparatus according to a second embodiment of the present invention.

In the housing 21 of a mechanical shift lock apparatus according to the embodiment, the first slide member 23 connected to the shift interlock wire 19 is mounted in a vertical direction in FIG. 8, and a lock member 61 is mounted in a horizontal direction in FIG. 8, i.e. perpendicularly to the first slide member 23.

The first slide member 23 is mounted to be slidable in a sliding bore 63 in the housing 21. An end of the shift interlock wire 19 is fixed to the housing 21 at an end of the sliding bore 63 by a fixing member 65. An end of an inner wire 67 of the shift interlock wire 19 is fixed to the first slide member 23. The first slide member 23 slides in the sliding bore 63 in an interlocking relation with a pulling or pushing operation of the inner wire 67. When the shift lever 1 connected with the shift interlock wire 19 is positioned at the P range, the first slide member 23 which slides in an interlocking relation with the inner wire 67 is positioned at a lockable position shown in FIG. 8.

The first slide member 23 has one rectangular engagement groove 69 which faces the lock member 61 when the first slide member 23 is positioned at the lockable position.

Figure 9:
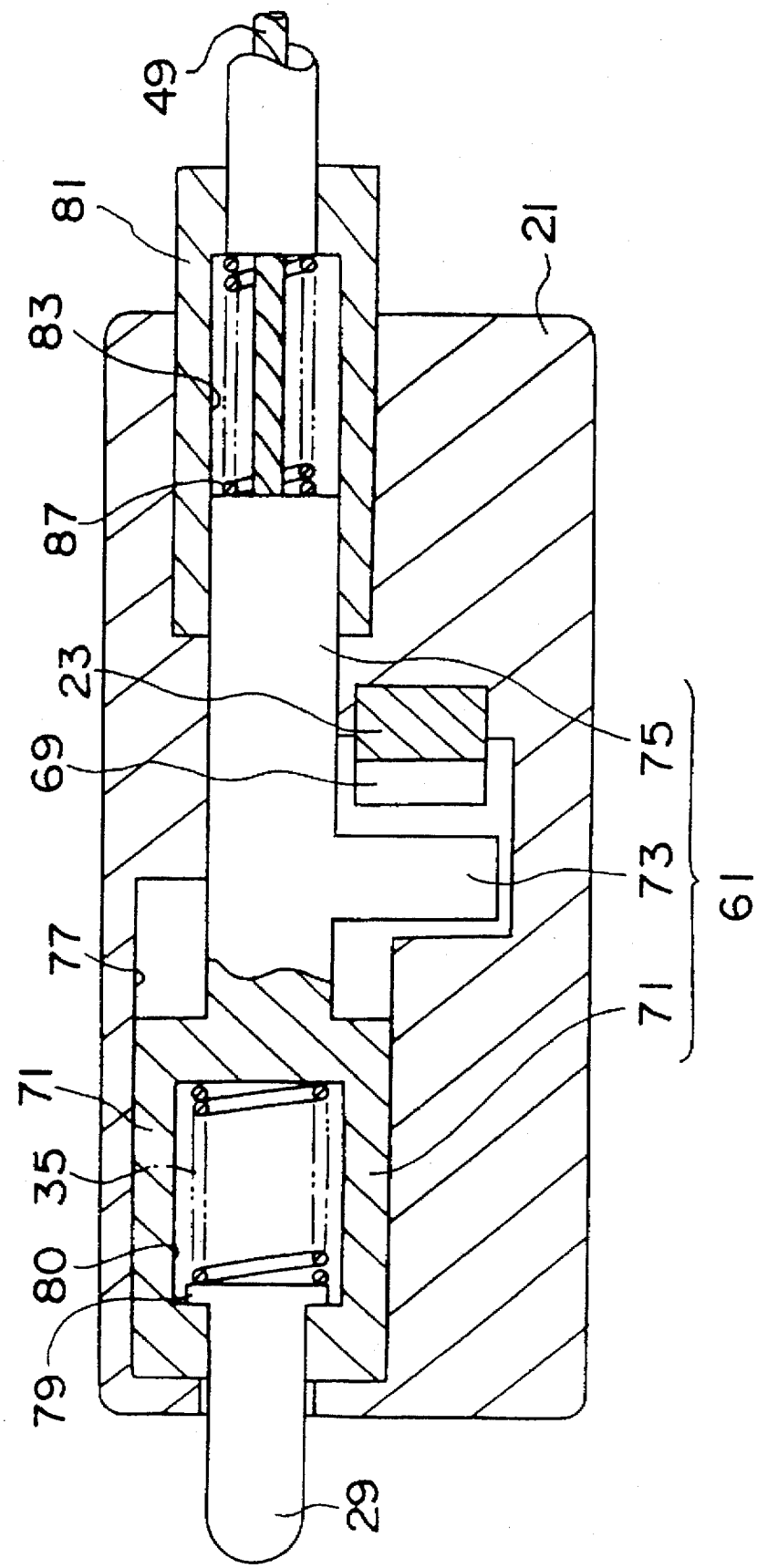
FIG. 9 is a cross-sectional view taken along line 9—9 in FIG. 8.

As shown in FIGS. 8 and 9, a lock pin mounting portion 71, a latch 73, and a connecting portion 75 for connection with the key interlock wire 49 are integrated into the lock member 61.

The lock pin mounting portion 71 is slidable in a guide bore 77 in the housing 21. The lock pin mounting portion 71 is shaped like a cylinder having a relatively large diameter, and the slide pin 29 is removably received in a bore 80 thereof at a free end thereof. A compression coil spring 35 is provided in the bore 80 between the bottom face of a flange 79 of the slide pin 29 and the bottom face of the bore 80 on the side of the latch 73, the flange 79 being provided to prevent the slide pin 29 from coming off the bore 80. The slide pin 29 is biased in its projecting direction by the spring 35.

The latch 73 of the lock member 61 is a quadrangular prism projecting perpendicularly from a shaft extending coaxially from the lock pin mounting portion 71 at a predetermined position thereof. The latch 73 fits into the engagement groove 69 in the first slide member 23 to lock the first slide member 23 thereby to restrict its axial movement (vertical movement in FIG. 8).

The connecting portion 75 of the lock member 61 is an end portion of the shaft from which the latch 73 projects. The connecting portion 75 is slidably inserted into a bore 83 in a cylindrical connecting member 81 mounted to the housing 21. An end portion of the key interlock wire 49 is fixed to the connecting member 81 at a free end portion thereof. An end of an inner wire 85 coming out from an end portion of the key interlock wire 49 is fixed to the connecting portion 75 at a free end thereof. A compression return spring 87 is provided in the bore 83 in the connecting member 81 between the end of the key interlock wire 49 and the free end of the connecting member 81.

The operation of the second embodiment will now be described. In the state shown in FIGS. 8 and 9, the first slide member 23 is at a lockable position, but the lock member 61 is unlocked. In the unlocked state, the shift lever 1 is positioned at the P range and is ready to be shifted to the N range, D range or R range. The key 41 is inserted into the key cylinder 43 and positioned at the ACC position, and the brake pedal 31 is stepped on.

In the state described above and illustrated in FIGS. 8 and 9, when the shift lever 1 is shifted to another range, for example the D range, the first slide member 23 slides in the direction of arrow A as illustrated by a two-dots-and-dash line in FIG. 8. The engagement groove 69 shifts away from a position facing the latch 73 of the lock member 61 to disable the engagement groove 69 and the latch 73 from engaging. In this state, if a driver attempts to rotate the key 41 inserted into the key cylinder 43 from the ACC position to the LOCK position, the latch 73 of the lock member 61 hits against the side face of the first slide member 23 to be restrained from engaging with the engagement groove 69. Also, even when a driver steps on and releases the brake pedal 31, the slide pin 29 merely slides in both directions under force of the spring 35. Thus, there arises no effect on a driver's stepping on and releasing the brake pedal 31.

A shift from the unlocked state shown in FIGS. 8 and 9 to a locked state is made as follows. When locking is to be effected by operating the key 41, the key 41 is inserted into the key cylinder 43 and rotated from the ACC position to the LOCK position. Then, the rotation of the cam 45 is transmitted to the pin 47 to pull the key interlock wire 49. Accordingly, the lock member 61 slides in the direction of arrow B in FIG. 8 to engage the latch 73 of the lock member 61 and the engagement groove 89 in the first slide member 23 thereby to lock the first slide member 23, i.e. to disable the first slide member 23 from moving in the direction of arrow A. In this locked state, the shift lever 1 is locked at the P range and is unable to shift to another range.

In the state illustrated in FIGS. 8 and 9, releasing the brake pedal 31 effects locking even when the key 41 is left at the ACC position. In detail, releasing the brake pedal 31 causes the slide pin 29 to be pressed in the direction of arrow B against force of the spring 35. Thus compressed spring 35 increases its force to overcome force of the return spring 87 thereby to engage the latch 73 and the engagement groove 69 in the first slide member 23. At this time, as the lock member 61 slides, the key interlock wire 49 is pushed back in the direction of arrow B. This backward movement of the wire 49, however, is absorbed by a play between the pin 47 interlocked with the end portion of the key interlock wire 49 and the cam 45. In the aforesaid locked state effected by releasing the brake pedal 31, the key 41 can be rotated from the ACC position to the LOCK position and vice verse, but the lock member 61 remains unmoved to maintain the locked state because the key interlock wire 49 is already at its lock position.

In order to undo the locked state, the brake pedal 31 is stepped on, and also the key 41 is rotated from the LOCK position to the ACC position. Consequently, the slide pin 29 released from a pressing force of the brake pedal 31 is pushed out by force of the spring 35, and hence the spring 35 expands. As a result of rotating the key 41 to the ACC position, the key interlock wire 49 is released from a pulling force applied by the cam 45 through the pin 47. As a result of stepping on the brake pedal 31, the slide pin 29 separates from the brake pedal 31, and hence the spring 35 does not activate force of moving the lock member 61 in the direction of arrow B, thereby allowing force of the return spring 87 to press the lock member 61 in the direction opposite to the direction of arrow B. Thus, the unlocked state shown in FIGS. 8 and 9 is established.

According to the second embodiment described above, lock members which engage with the first slide member 23 are integrated into the single lock member 61. Thus, the number of parts is reduced, the structure is simplified, and the apparatus is made compact.

The construction, action, and effect of the second embodiment other than those described above are similar to those of the first embodiment described above in the section thereof, and hence their description is omitted.

According to the aforesaid first and second embodiments, the rotating lock cam 9 is used as a lock mechanism to mechanically lock the shift lever 1 at the P range. However, a lock plate which moves linearly to effect locking may be used instead.

According to the aforesaid first and second embodiments, the second slide member 53 or the lock pin 33 is substantially perpendicular to the first slide member 23, and the lock member 61 is substantially perpendicular to the first slide member 23. However, they may intersect at a certain angle, not at right angles, and even so a similar effect as in the case of the embodiments is still provided, thus exhibiting an advantage over the conventional parallel arrangement.

According to the aforesaid first and second embodiments, a groove is formed in the first slide member 23 to make the first engagement groove 25, the second engagement groove 27, or the engagement groove 69. On the contrary, a projection may be formed on the first slide member 23, and a groove may be formed in the lock pin 33, the second slide member 53, and the lock member 61, and thus the projection and the groove may engage.

Furthermore, according to the aforesaid first and second embodiments, a housing is provided as guide means for slidably mounting the first slide member having the first and second engagement grooves, the lock pin, and the lock member. However, other guide means may be used. For example, cylindrical members may be linked together for slidably guiding the first slide member having the first and second engagement grooves, the lock pin, and the lock member.

Figure 10:
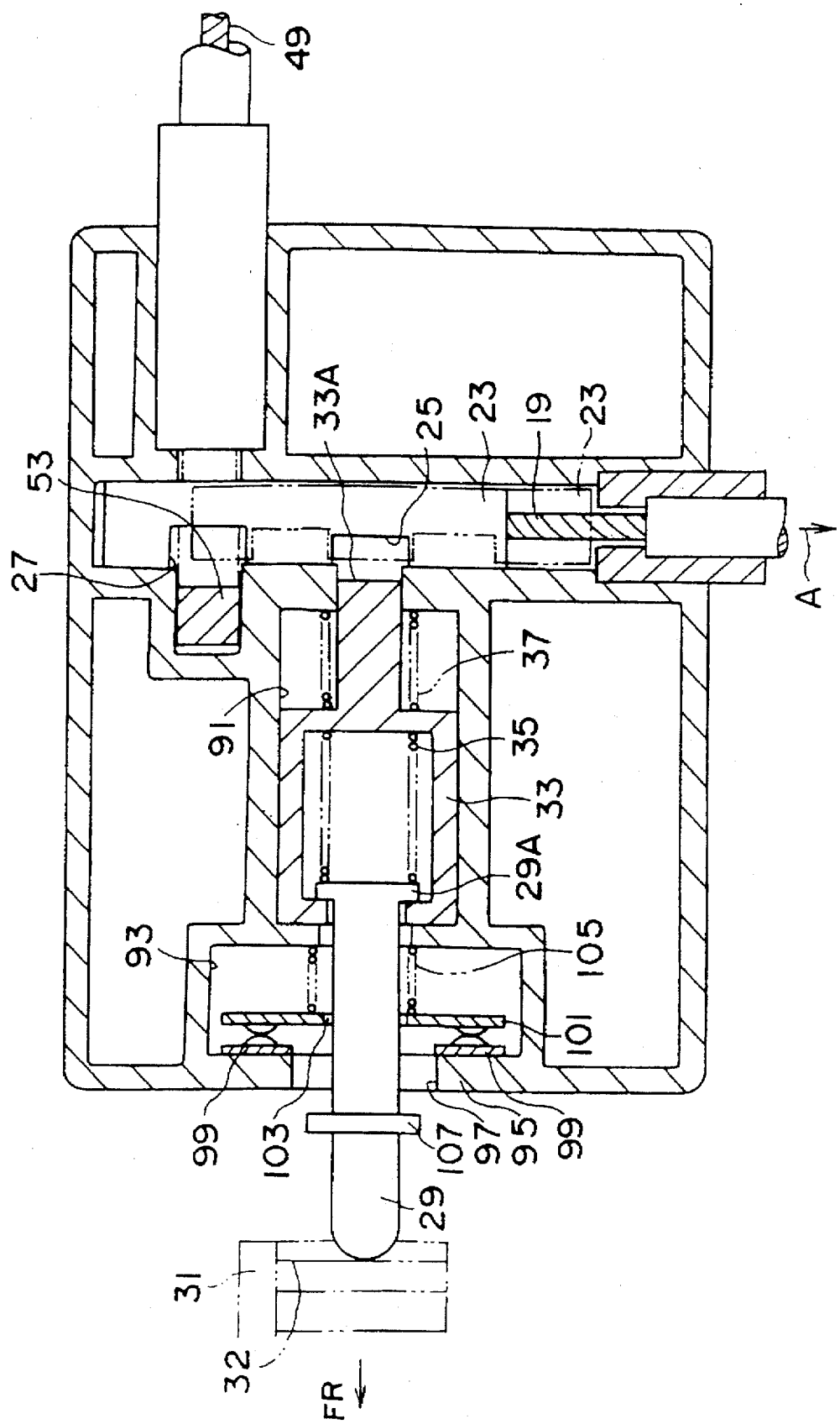
FIG. 10 is a horizontal cross-sectional view of a housing of an apparatus according to a third embodiment of the present invention.
Figure 11:
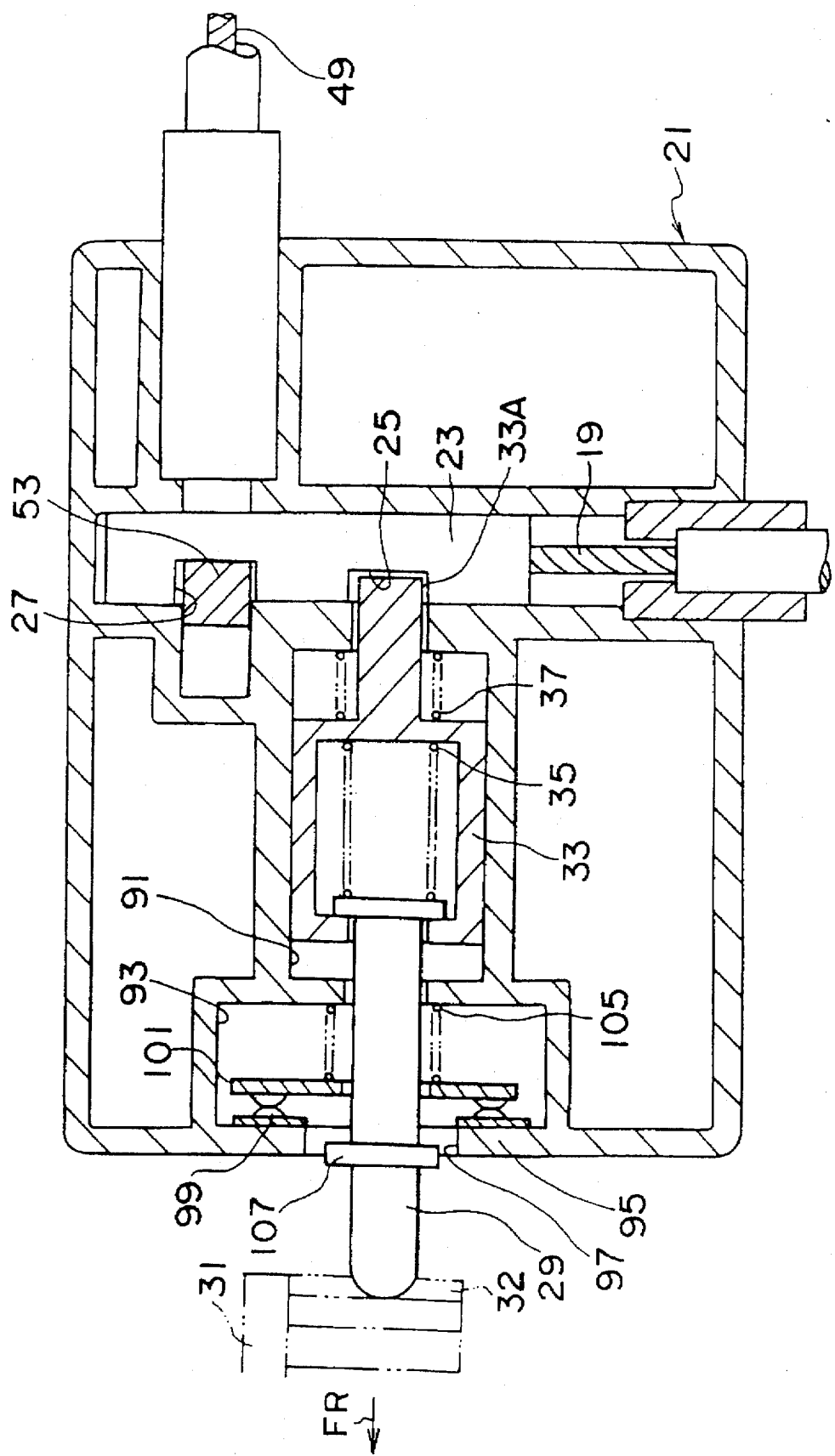
FIG. 11 is a view showing the operation of the apparatus shown in FIG. 10.

Third embodiment:

According to the third embodiment of the present invention, the first slide member represented by a solid line in FIG. 10 is at its lock position, and the one represented by a two-dots-and-dash line is at its unlock position.

According to the present embodiment, an electric switch room 93 is integrally provided on the outer side of a lock pin guide 91 in the housing 21. Stationary contacts 99 are located on the inner surface of a peripheral wall 95 of the housing 21 at predetermined positions horizontally opposed to each other with a through hole 97 located therebetween, the through hole 97 being provided in the peripheral wall 95 for the slide pin 29 to extend therethrough, the contacts 99 being one of two elements composing a switching contact. A moving contact 101 which is another element of the switching contact is provided on the slide pin 29. In detail, the moving contact 101 is a plate-like element having a through hole 103 at the center thereof, and the slide pin 29 slidably extends through the through hole 103 thereby to carry the moving contact 101 thereon.

A compression contact spring 105 is provided in the electric switch room 93 between the moving contact 101 and a wall of the room 93 on the side of the lock pin guide 91 thereby to bias the moving contact 101 in a direction of closing connection to the stationary contacts 99.

A flange 107 is provided on the slide pin 29 at a predetermined position for moving the moving contact 101. The flange 107 is adapted to separate from the moving contact 101 when the brake pedal 31 is stepped on by a predetermined quantity or more, thereby permitting the moving contact 101 to contact the stationary contacts 99 under force of the spring 105. The stationary contacts 99 and the moving contact 101 are connected to a power source of the vehicle and brake lamps (both not shown) and are adapted to turn on the brake lamps when they close connection to each other.

In the present embodiment, as in the first embodiment, the lock pin 33 and the second slide member 53 engage with the first slide member 23 perpendicularly to each other. Thus, the first slide member 23 and the shift interlock wire 19 can be securely locked.

The operation of the switching contact will now be described in connection with a shift lock operation.

Figure 12:
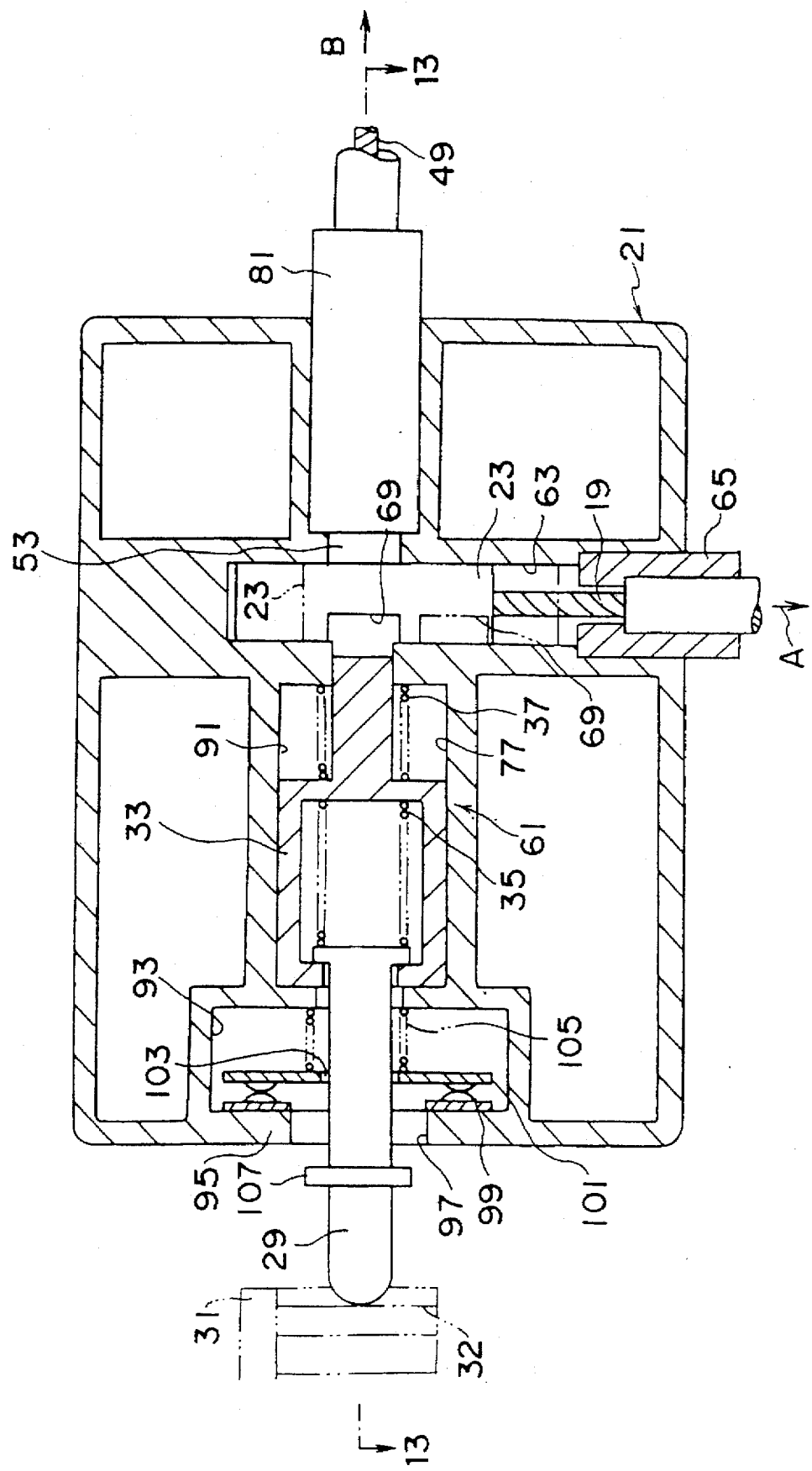
FIG. 12 is a horizontal cross-sectional view of a housing of an apparatus according to a fourth embodiment of the present invention.

First, when the brake is released, i.e. when the brake pedal 31 is not stepped on, a shift lock apparatus according to the present embodiment is in a state shown in FIG. 12. When the brake pedal 31 is stepped on, the shift lock apparatus enters a state shown in FIG. 10. In detail, the second spring 37 expands to move the lock pin 33 in the direction of arrow FR, and the first spring 35 expands to push out the slide pin 29 in the direction of arrow FR. As the slide pin 29 moves in the direction of arrow FR, the flange 107 also moves in the same direction. Accordingly, the moving contact 101 which has been pressed by the flange 107 moves in the direction of arrow FR under force of the contact spring 105 to contact the stationary contacts 99, thereby closing an electric circuit of brake lamps and the like and thus lighting the brake lamps.

Next, when the stepped-on brake pedal 31 shown in FIG. 1 is released, the contact portion 32 of the brake pedal 31 moves the slide pin 29 in the direction opposite to the direction of arrow FR. Since the first spring 35 has a stronger force than the second spring 37, as the slide pin 29 moves in the direction opposite to the direction of arrow FR, the second spring 37 is compressed. As a result, the lock pin 33 fits into the first engagement groove 25 to establish a locked state.

Also, as the slide pin 29 moves in the direction opposite to the direction of arrow FR, the flange 107 moves the moving contact 101 in the direction opposite to the direction of arrow FR against force of the contact spring 105. Thus, the moving contact 101 is separated from the stationary contacts 99 to open the electric circuit thereby to reach the state shown in FIG. 12. As a result, the brake lamps go off.

The construction, action, and effect of the third embodiment other than those described above are similar to those of the first embodiment described above in the section thereof, and hence their description is omitted.

Fourth embodiment:

The fourth embodiment of the present invention will now be described with reference to FIGS. 12 and 13. An apparatus according to the present embodiment is the same as the apparatus according to the third embodiment except that the lock pin 33 is integrated with the second slide member 53 which engages with the second engagement groove 27.

In the present embodiment, the overall length of the first slide member 23 is shorter than that of the third embodiment. The first slide member 23 shown in FIG. 12 is at a lockable position. When the first slide member 23 is positioned at its lockable position, the single rectangular engagement groove 69 therein is opposed to the lock pin As shown in FIG. 13, the second slide member 53 is integrated with the lock pin 33. Accordingly, a projecting end portion 53A of the second slide member 53 is a part of a lock member and also serves as an engaging member.

The operation of the fourth embodiment will now be described. In the state shown in FIGS. 12 and 13, the first slide member 23 is at its lockable position, but the first slide member 23 and the second slide member 53 are unlocked. In the unlocked state, the shift lever 1 is positioned at the P range and is ready to be shifted to the N range, D range or R range. The key 41 is inserted into the key cylinder 43 and positioned at the ACC position, and the brake pedal 31 is stepped on.

In the state described above and illustrated in FIGS. 12 and 13, when the shift lever 1 is shifted to another range, for example the D range, the first slide member 23 slides in the direction of arrow A as illustrated by a two-dots-and-dash line in FIG. 12. The engagement groove 69 shifts away from a position facing the end portion 53A of the second slide member 53 to disable the engagement groove 69 and the end portion 53A from engaging. In this state, if a driver attempts to rotate the key 41 inserted into the key cylinder 43 from the ACC position to the LOCK position, the end portion 53A of the second slide member 53 hits against the side face of the first slide member 23 to be restrained from engaging with the engagement groove 69. Also, even when a driver steps on and releases the brake pedal 31, the slide pin 29 merely slides in both directions under force of the spring 35. Thus, there arises no effect on a driver's stepping on and releasing the brake pedal 31.

A shift from the unlocked state shown in FIGS. 12 and 13 to a locked state is made as follows. When locking is to be effected by operating the key 41, the key 41 is inserted into the key cylinder 43 and rotated from the ACC position to the LOCK position. Then, the rotation of the cam 45 is transmitted to the pin 47 to pull the key interlock wire 49. Accordingly, the second slide member 53 slides in the direction of arrow B in FIG. 13 to engage the end portion 53A of the second slide member 53 and the engagement groove 69 in the first slide member 23 thereby to lock the first slide member 23, i.e. to disable the first slide member 23 from moving in the direction of arrow A. In this locked state, the shift lever 1 is locked at the P range and is unable to shift to another range.

Figure 13:
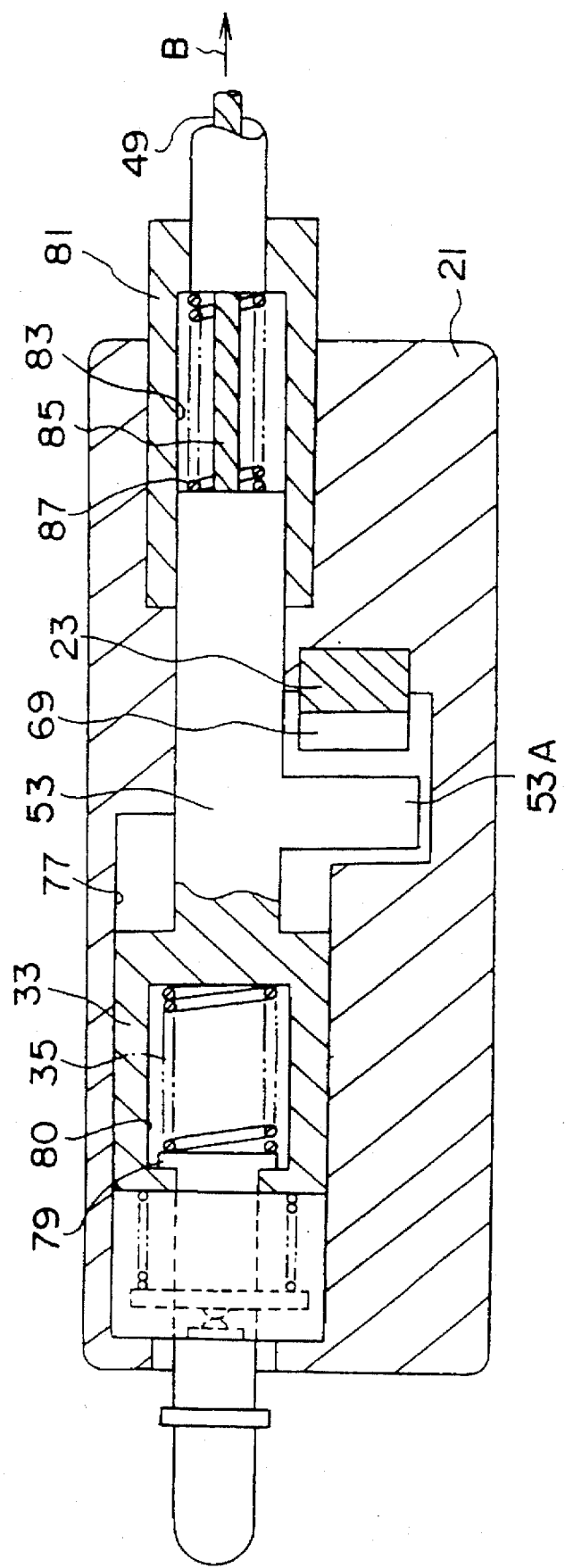
FIG. 13 is a cross-sectional view taken along line 13—13 in FIG. 12.

In the state illustrated in FIGS. 12 and 13, releasing left at the ACC position. In detail, releasing the brake the brake pedal 31 effects locking even when the key 41 is pedal 31 causes the slide pin 29 and the lock pin 33 to be pressed in the direction of arrow B in FIG. 12 against force of the return spring 37. As a result, the end portion 53A of the second slide member 53 engages with the engagement groove 69 in the first slide member 23. The position of the flange 107 and other relevant construction factors are set so that the stationary contacts 99 and the moving contact 101 of an electric switch contact each other to turn on the electric switch at this engagement. With this construction, when the key 41 is rotated in the state shown in FIG. 12, the key interlock wire 49 is pulled to pull the lock pin 33 in the direction of arrow B in FIG. 12 thereby to engage the engagement groove 69 and the end portion 53A of the second slide member 53. Even so, since the brake pedal 31 is not completely released, the stationary contacts 99 and the moving contact 101 are held connected to each other so that an electric switch of brake lamps or the like is held on.

Then, when the slide pin 29 is pushed by the brake pedal 31 in the direction of arrow B in FIG. 12, the spring 35 is compressed. Thus, the flange 107 abuts on the moving contact 101 to push it in the direction of arrow B in FIG. 12 thereby to separate it from the stationary contacts 99, thus turning off the electric switch. At this time, as the second slide member 53, the key interlock wire 49 is pushed back in the direction of arrow B. This backward movement of the wire 49, however, is absorbed by a play between the pin 47 interlocked with an end portion of the key interlock wire 49 and the cam 45. In the aforesaid locked state effected by releasing the brake pedal 31, the key 41 can be rotated from the ACC position to the LOCK position and vice verse, but the second slide member 53 remains unmoved to maintain the locked state because the key interlock wire 49 is already at its lock position.

In order to undo the locked state, the brake pedal 31 is stepped on, and also the key 41 is rotated from the LOCK position to the ACC position. Consequently, the slide pin 29 released from a pressing force of the brake pedal 31 is pushed out by force of the spring 35, and hence the spring 35 expands. As a result of rotating the key 41 to the ACC position, the key interlock wire 49 is released from a pulling force applied by the cam 45 through the pin 47. As a result of stepping on the brake pedal 31, the slide pin 29 separates from the brake pedal 31, and hence the spring 35 does not activate force of moving the second slide member 53 in the direction of arrow B, thereby allowing force of the return spring 37 to press the second slide member 53 in the direction opposite to the direction of arrow B. Thus, the unlocked state shown in FIGS. 12 and 13 is established.

According to the fourth embodiment described above, the second slide member 53 which engages with the first slide member 23 is integrated with the lock pin 33. Thus, the number of parts is reduced, the structure is simplified, and the apparatus is made compact.

The construction, action, and effect of the fourth embodiment other than those described above are similar to those of the third embodiment described above in the section thereof, and hence their description is omitted.

Fifth embodiment:

A fifth embodiment of the present invention will now be described with reference to FIGS. 14 and 15.

The present embodiment is the same as third embodiment except that a projection of a slide pin is adjustable. According to the present embodiment, the electric switch room 93 is integrally provided on the outer side of the lock pin guide 91 (at the left of the lock pin guide 91 in FIG. 14) in the housing 21 of a mechanical shift lock apparatus. The stationary contacts 99 are located on the inner surface of the peripheral wall 95 of the housing 21 at predetermined positions horizontally opposed to each other with a through hole 111 located therebetween, the through hole 111 being provided in the peripheral wall 95 for the slide member 109 to extend therethrough. The moving contact 101 is provided around the slide member 109. In detail, the moving contact 101 is a plate-like element having the large-diameter through hole 103 at the center thereof, and the slide member 109 slidably extends through the through hole 103.

The compression contact spring 105 is provided in the electric switch room 93 between the moving contact 101 and a wall of the room 93 on the side of the lock pin guide 91 thereby to bias the moving contact 101 in a direction of closing connection to the stationary contacts 99.

The flange 107 is provided on the slide member 109 at a predetermined position for moving the moving contact 101.

The slide member 109 is a shaft having a relatively large diameter and has a mounting bore 113 formed therein in an axial direction thereof. A plurality of rectangular beam-like elastic portions 113A are provided on the side wall of the mounting bore 113 of the slide member 109. The elastic portions 113A are formed by providing cushioning cavities 115 in the slide member 109. The cushioning cavity 115 is composed of a cavity which opens onto one end (hereinafter referred to end A) of the mounting bore 113 and extends behind the elastic portion 113A to the vicinity of another end (hereinafter referred to end B) of the mounting bore 113 and cavities each of which opens onto end B and extends along the side of the elastic portion 113A to the vicinity of end A. How the cushioning cavities 115 are provided in the slide member 109 is described below. When the slide member 109 is to be formed by plastics molding, a mold member corresponding to a cavity formed behind the elastic portion 113A is inserted from one end of the slide member 109, and a mold member corresponding to side cavities formed along the elastic portion 113A is inserted from another end of the slide member 109. An engagement projection 117 projects into the mounting bore 113 from the elastic portion 113A at an axial center thereof, the engagement projection 117 having a triangular cross section. A columnar pin member 119 is inserted into thus constructed mounting bore 113. The engagement projections 117 projecting from the elastic portions 113A are adapted to abut on the pin member 119 at several peripheral positions thereof. The pin member 119 has a semispheric tip, and many circular V-shaped engagement grooves 121 are cut therein between an intermediate portion and a base end thereof.

The pin member 119 is inserted into the mounting bore 113 from the base end thereof. When the pin member 119 is further inserted after the engagement projections 117 have abutted on the engagement groove 121, elastic portions 113A deflect toward the cushioning cavities 115 to permit the pin member 119 to be inserted further. The engagement projections 117 are adapted to remain engaged with one of engagement grooves 121 so that the pin member 119 is not pushed in toward the bottom of the mounting bore 113 unless force of pushing the pin member 119 exceeds a certain value.

The base portion of the slide member 109 is slidably fit into a guide bore 123 in the lock pin 33. The first spring 35 is provided between the bottom face of the slide member 109 and the bottom face of the guide bore 123. A flange 125 is provided at the base portion of the slide member 109 to prevent the slide member 109 from slipping off the guide bore 123. The tip of a projection 109A projecting from the bottom of the slide member 109 is inserted into the pin member 119 to maintain the coaxial arrangement of the pin member 119 and the mounting bore 113.

The operation and use of the fifth embodiment will now be described.

The description below is about the case where an apparatus according to the present embodiment is installed near a brake pedal. The housing 21 of the apparatus according to the present embodiment is installed on a mounting member located at a predetermined position near the brake pedal 31. Next, the installation of the apparatus is adjusted. For the adjustment, the shift lever 1 is shifted to other than the parking (P) position, for example to the neutral (N) position. In detail, when the apparatus is mounted on the vehicle body, the shift interlock wire 19 shown in FIG. 14 is pulled, i.e. the first engagement groove 25 is not opposed to the rear end of the lock pin 33 and thus is not ready to engage with the rear end of the lock pin 33. The brake pedal 31 abuts on the pin member 119 to push it in the direction opposite to the direction off arrow FR. Then, first, the slide member 109 is pushed inward in the direction opposite to the direction of arrow FR, and thus the lock pin 33 is also pushed inward by force of the first spring 35. Accordingly, while the second spring 37 is being compressed, the lock pin 33 gets engaged with the first slide member 23 under pressure. Next, the spring 35 compresses, and a rear end 109B of the slide member 109 abuts on a front end 33A of the lock pin 33. In this state, if the brake pedal 31 is not back at a no-load position, a worker manually pulls the brake pedal 31 in the direction opposite to the direction of arrow FR until it hits against a stop member, not shown. When the stopper member is an elastic body like a rubber, the brake pedal 31 is pulled in the direction opposite to the direction of arrow FR until the stopper member sufficiently makes an elastic deformation. By doing so, the pin member 119 is strongly pushed inward in the direction opposite to the direction of arrow FR. As a result, the portion bearing engagement grooves 121 of the pin member 119 is thrusted up to a position required for use while elastically deforming the elastic portions 113A provided with the engagement projection 117. As described above, the worker can adjust the installation of the apparatus according to the present invention without doing a troublesome work of adjusting the installation position of the housing 21 by repeatedly loosening and tightening screws.

Figure 15:
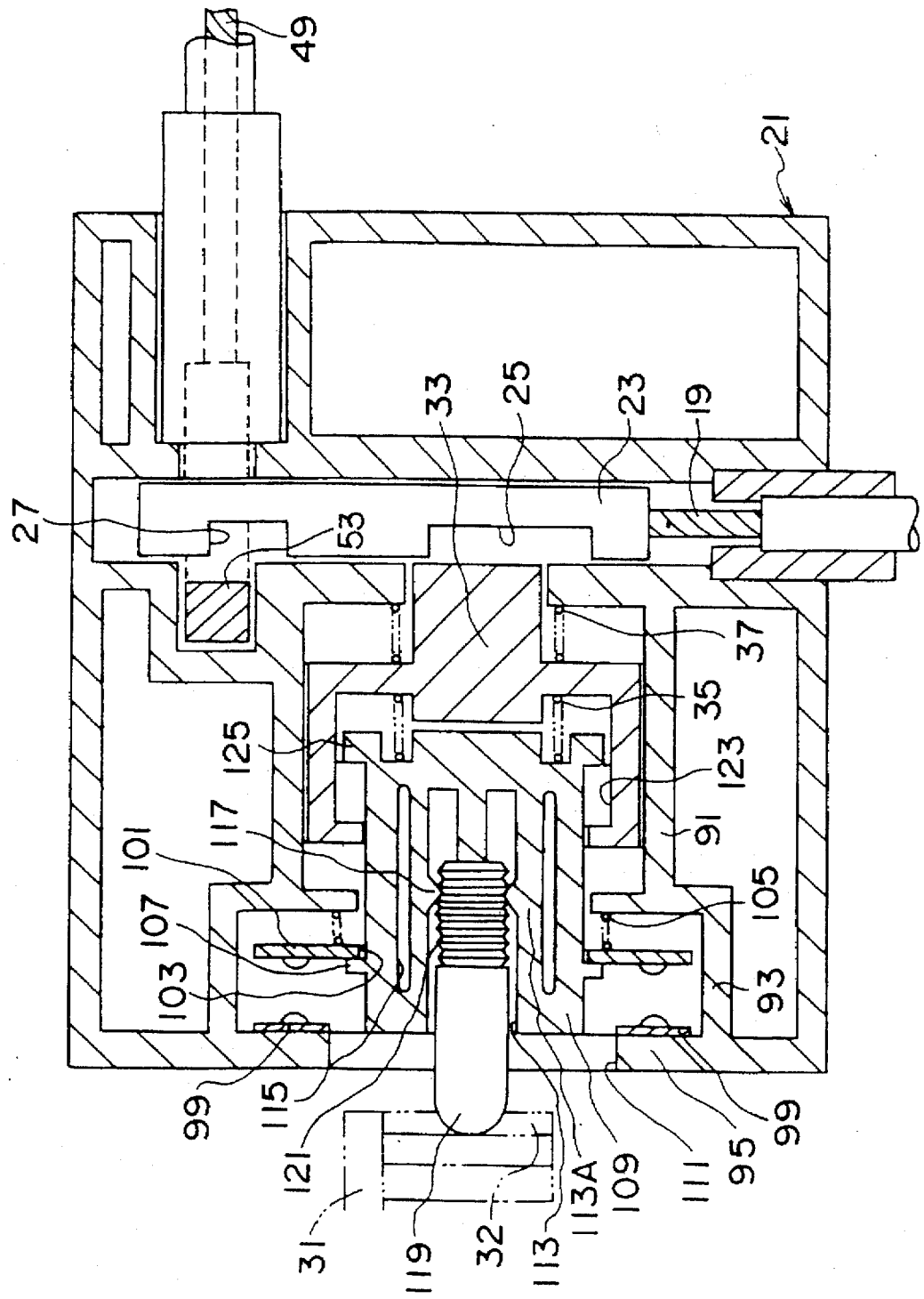
FIG. 15 is a view showing the operation of the apparatus shown in FIG. 14.

In the state shown in FIG. 15, while the slide member 109 is moving in the direction opposite to the direction of arrow FR, the flange 107 abuts on the moving contact 101 to move the moving contact 101 in the direction opposite to the direction of arrow FR against force of the contact spring 105 thereby to separate the moving contact 101 from the stationary contacts 99.

Next, the case where the brake pedal 31 is stepped on is described. In this case, the first spring 35 expands to push out the slide member 109 in the direction of arrow FR. As the slide member 109 moves, the flange 107 also moves in the direction of arrow FR. Accordingly, the moving contact 101 which has been pressed by the flange 107 moves in the direction of arrow FR because of force of the contact spring 105 to contact the stationary contacts 99 thereby to close an electric circuit of brake lamps and the like. Thus, the state shown in FIG. 14 is established.

Figure 14:
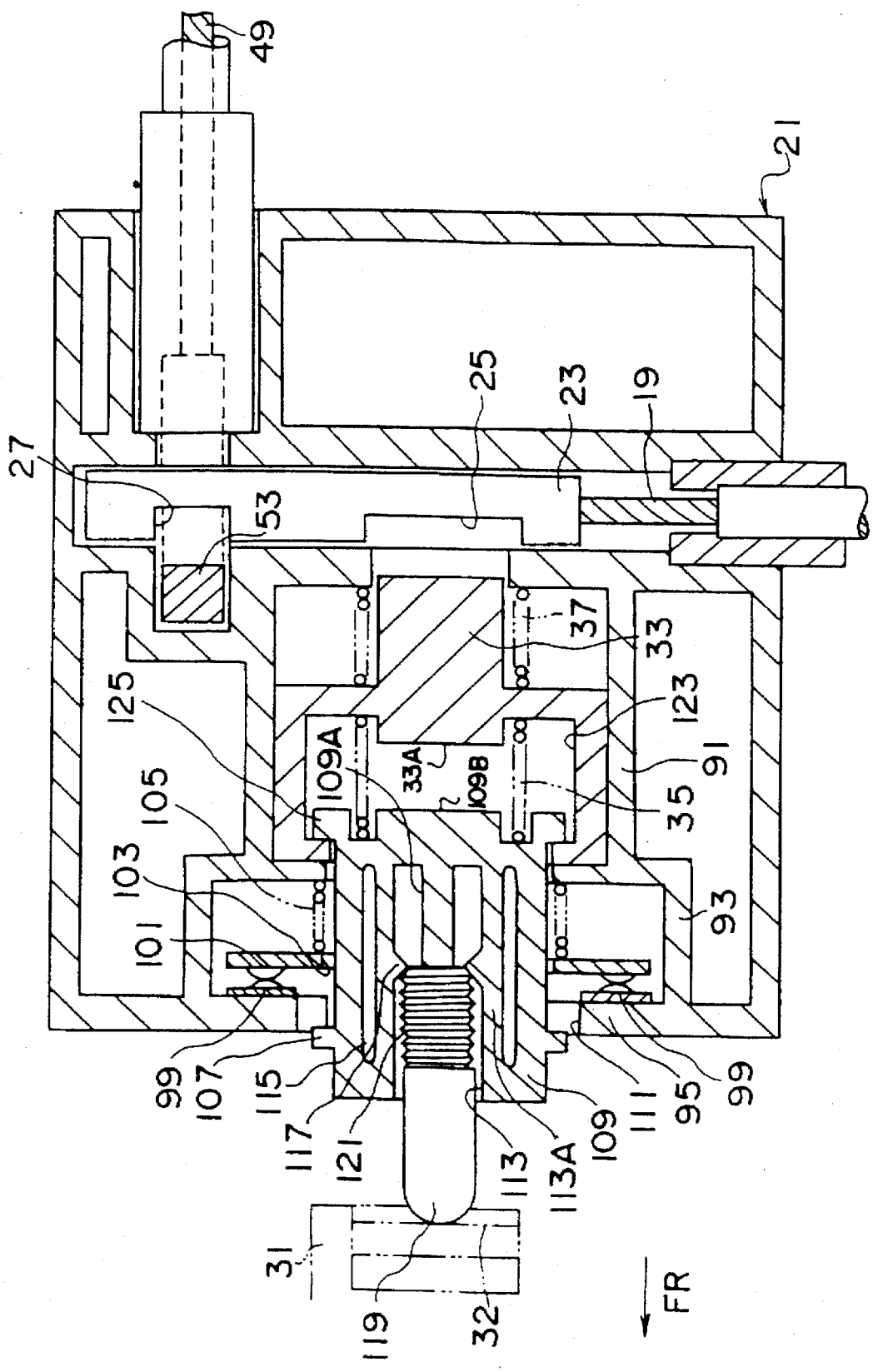
FIG. 14 is a horizontal cross-sectional view of a housing of an apparatus according to a fifth embodiment of the present invention.

When the stepped-on brake pedal 31 is returned to the brake release position from the state shown FIG. 14, the locked state shown in FIG. 15 is restored according to the same procedure as in the aforesaid adjustment of installation.

Figure 16:
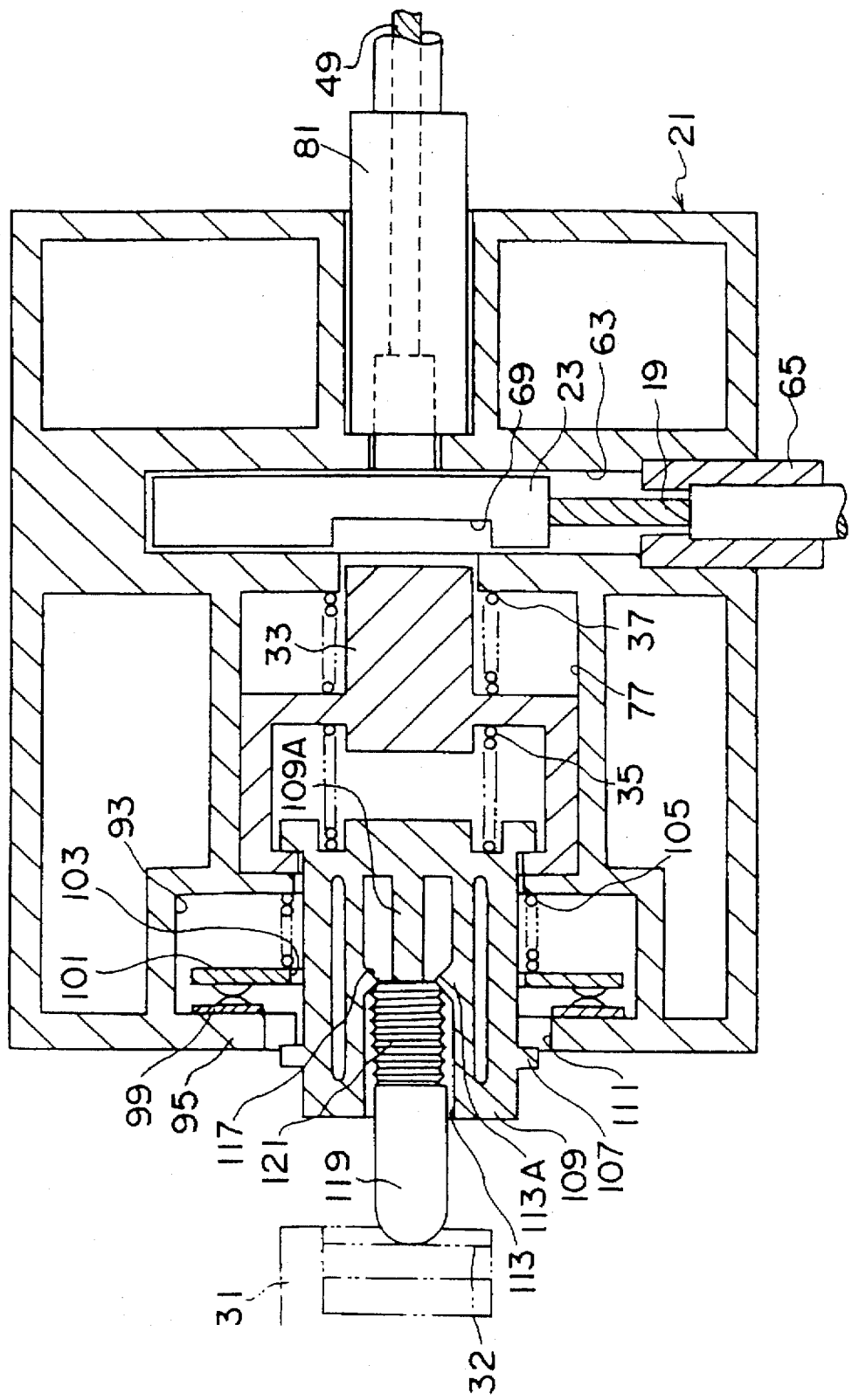
FIG. 16 is a horizontal cross-sectional view of a housing of a modified apparatus according to the fifth embodiment of the present invention.

Needless to say, the electric switch portion of the fifth embodiment may be combined, as shown in FIG. 16, with an integrated structure of the lock pin and the second slide member shown in FIGS. 12 and 13. Also, ridges and grooves which compose the engagement grooves 121 of the fifth embodiment may be made radially elastic.

The construction, action, and effect of the fifth embodiment other than those described above are similar to those of the fourth embodiment, and hence corresponding members are denoted common reference numerals and their description is omitted.

Means for attaching the pin member 119 to the slide member 109 or a lock member in such a manner that a projection of the pin member 119 from the slide member 109 is adjustable is not limited to the aforesaid structure, but may employ a structure of screw type, pressure fit type, cam type or many other types.

Sixth embodiment:

A sixth embodiment of the present invention will now be described with reference to FIGS. 17 to 22.

Figure 17:
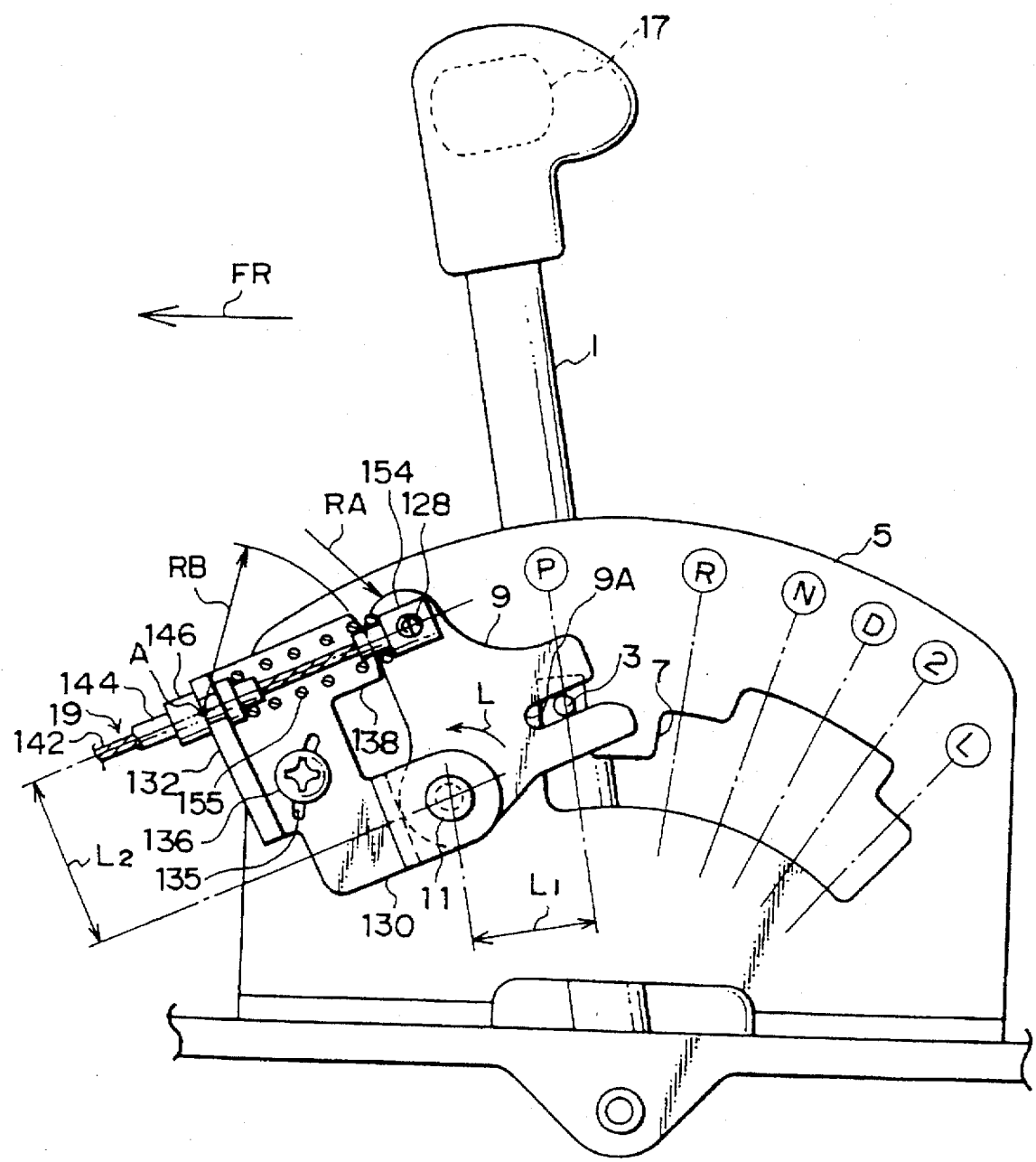
FIG. 17 is a side view showing a shift lever and its peripheral mechanism of an apparatus according to a sixth embodiment of the present invention.

As shown in FIG. 17, when the shift lever knob 17 provided on the shift lever 1 is pressed, the detent pin 3 is pressed downward in FIG. 17, the detent pin 3 serving as an engaging member. As the shift lever 1 swings toward the front or rear of the vehicle (in the direction of arrow S), the detent pin 3 changes its position of engagement with the detent groove 7 in the detent plate 5 to effect a shift to and from the P (parking) range, the R range, the N range, and the D range. The detent pin 3 is biased upward in FIG. 17 by a spring, not shown.

Figure 18:
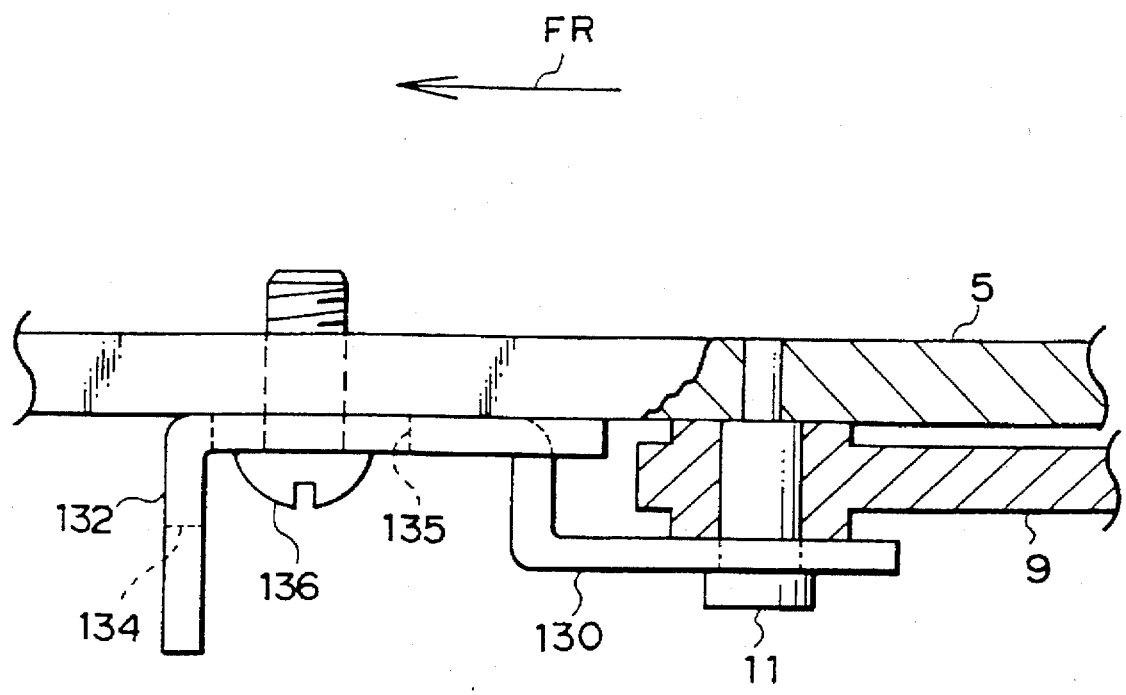
FIG. 18 shows the bracket and the lock cam of the apparatus shown in FIG. 21 which is viewed in the direction of arrow A in FIG. 21.

As shown in FIGS. 17 and 18, a pivot 11 stands on the detent plate 5 ahead of the detent groove 7 in the forward direction of the vehicle (in the direction of arrow FR), and the lock cam 9 is rotatably mounted on the pivot 11.

As shown in FIG. 17, the lock cam 9 is provided with the U-shaped groove 9A to accept the detent pin 3 of the shift lever 1 located at the P position. With the shift lever 1 positioned at the P range as shown in FIG. 17, when the lock cam 9 rotates in the direction of arrow L to an illustrated position (lock position) and is fixed at the position, the detent pin 3 is prevented from slipping out of the detent groove for the P range (prevented from moving downward in FIG. 17). Accordingly, the shift lever 1 cannot shift from the P range to another range unless the lock cam 9 rotates in the direction opposite to the direction of arrow L in FIG. 17 to an unlock position to permit the detent pin 3 to slip out of the U-shaped groove 9A.

Figure 19:
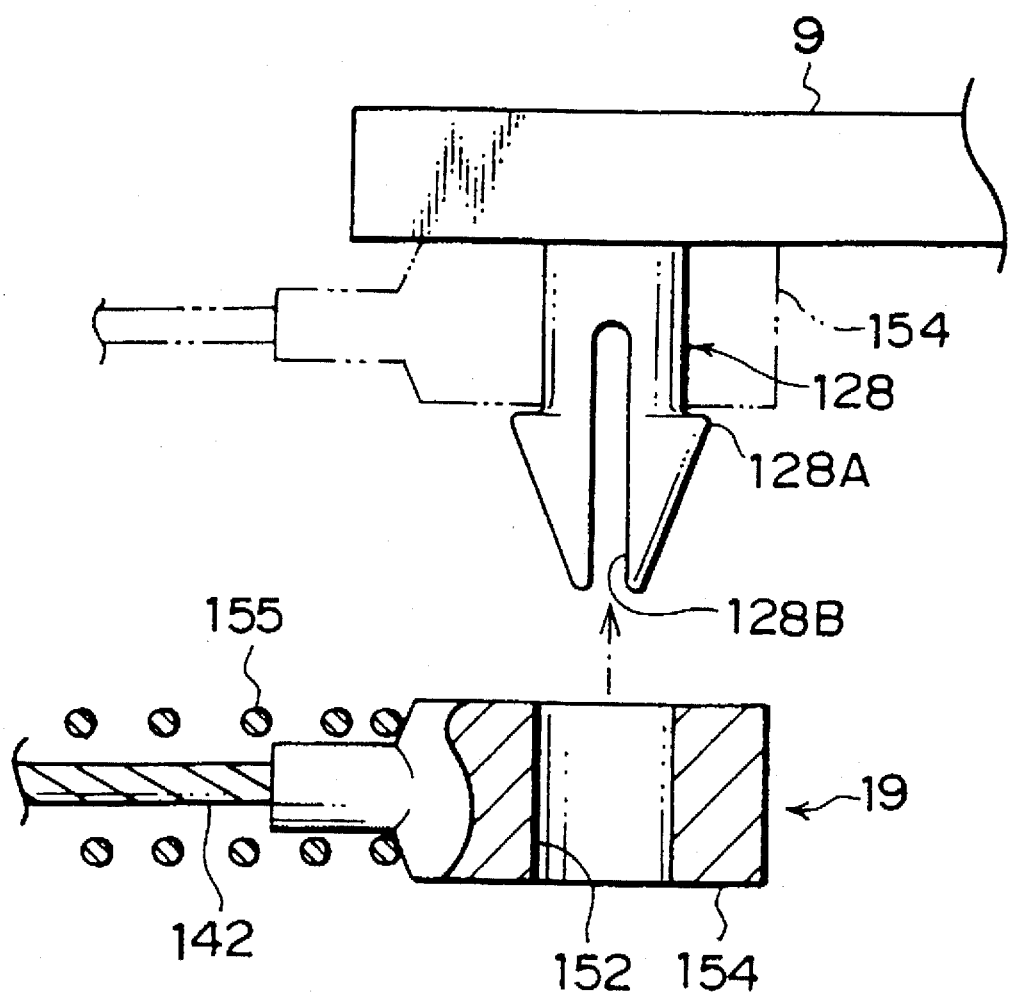
FIG. 19 is a view showing the engagement pin and its periphery of FIG. 21 as viewed in the direction of arrow A in FIG. 21.

As shown in FIGS. 17 and 19, an engagement pin 128 (a first engagement portion) stands on the lock cam 9 near an upper edge portion thereof, an engagement metal piece 154 fixed to an end of an inner wire 142 of the shift interlock wire 19, described later, engagement to the engagement pin 128. As shown in FIG. 19, the tip of the engagement pin 128 is shaped like an arrowhead to provide a hooking portion 128A, and a groove 128B is formed therein along a centerline thereof. The upper edge portion of the lock cam 9 is formed into an arc of radius RA of curvature with the engagement pin 128 as a center thereof.

As shown in FIGS. 17 and 18, a bracket 130 is disposed on the detent plate 5 ahead of the lock cam 9 in the forward direction of the vehicle, the bracket 130 serving as a member to fix an outer sheath thereto. The bracket 130, together with the lock cam 9, is rotatably mounted on the pivot 11.

Figure 20:
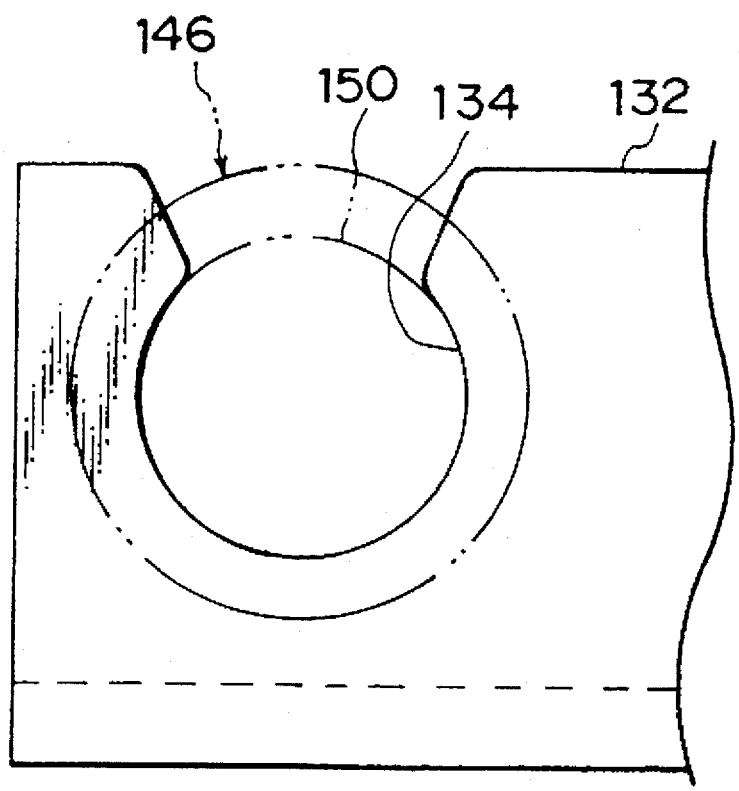
FIG. 20 shows a groove formed in the bracket shown in FIG. 21 as viewed in the direction of arrow B.

An edge of the bracket 130 on the front side of the vehicle is bent perpendicularly to the detent plate 5 to form a bend 132. A groove 134 (a second engagement portion) having a narrowed opening is formed in the bend 132 as shown in FIG. 20.

As shown in FIG. 17, an arc slot 135 is formed, with the pivot 11 as a center of curvature, in the bracket 130 at a central portion thereof. The bracket 130 is fixed on the detent plate 5 by tightening a screw 136 through the slot 135, as shown in FIG. 18.

Figure 21:
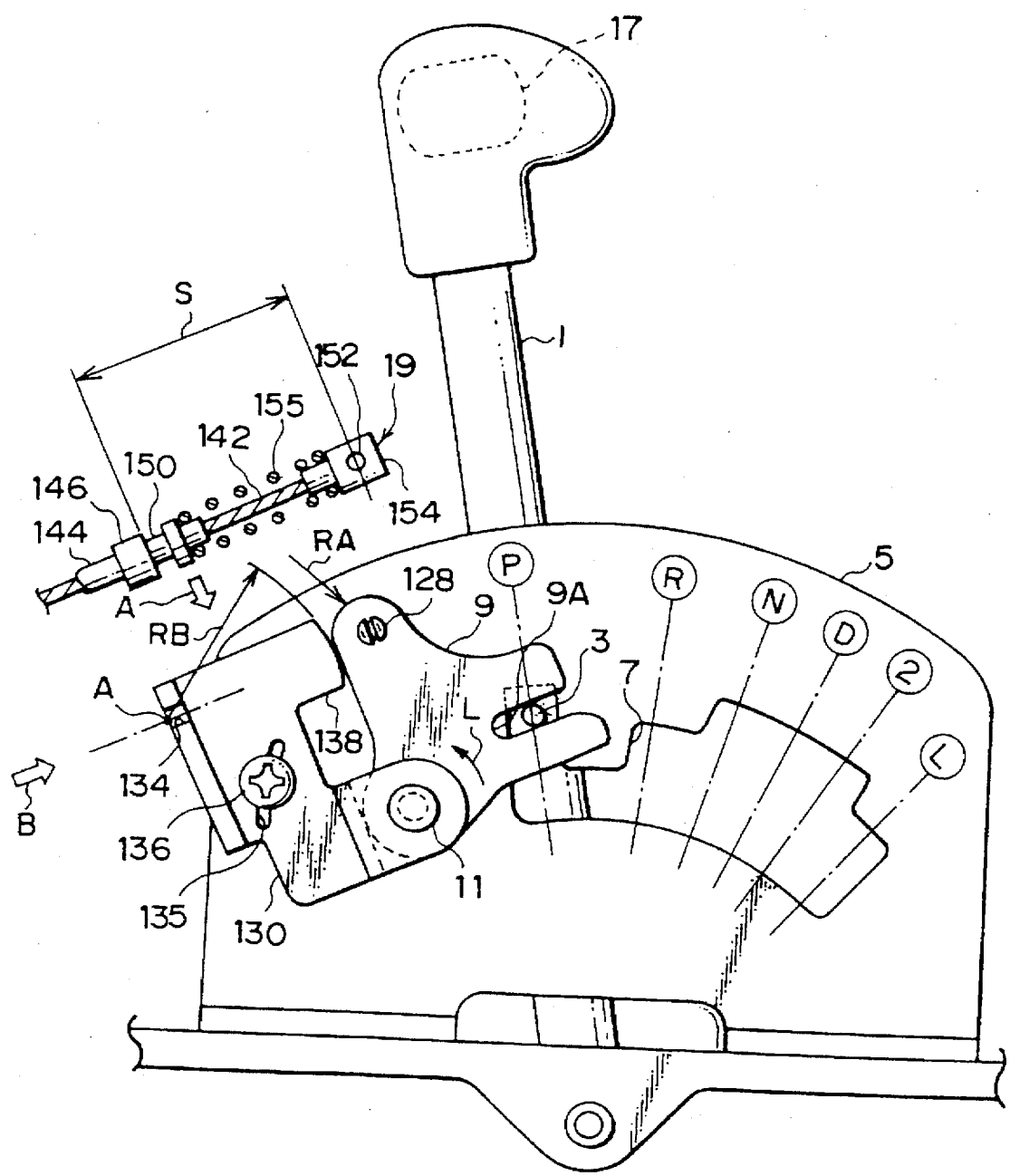
FIG. 21 is a side view of the shift lever and its periphery before a shift interlock wire assembly is attached thereto.

As shown in FIG. 21, a projection 138 integrally projects from the bracket 130 toward the engagement pin 128 of the lock cam 9. The tip of the projection 138 is in the shape of an arc of a radius RB of curvature with point A as a center, point A being the intersection of the face of the bend 132 on the front side of the vehicle and the centerline of the groove 134.

The lock cam 9 rotates to its lock or unlock position in an interlocking relation with the inner wire 142 of the shift interlock wire 19.

The inner wire 142 is sheathed with a tubular outer sheath 144. A mounting metal cylinder 146 is fixed to the outer sheath 144 at an end portion thereof. A groove 150 (a second engagement portion) is formed in the mounting metal cylinder at an intermediate portion thereof. The end portion of the outer sheath 144 is fixed to the bracket 130 as shown in FIG. 17 by fitting the groove 150 of the mounting metal cylinder 146 into the groove 134 of the bracket 130.

As shown in FIGS. 19 and 21, the engagement metal piece 154 is fixed to the tip of the inner wire 142, an engagement hole 152 (a first engagement portion) being formed in the engagement metal piece 154. The inner wire 142 is linked with the lock cam 9 by inserting the engagement pin 128 of the lock cam 9 into the engagement hole 152 in the engagement metal piece 154.

A spring 155 is disposed between the mounting metal cylinder 146 and the engagement metal piece 154. The spring 155 applies a force to the inner wire 142 in the direction of drawing out the inner wire 142 from the housing 21 thereby to apply a force to the lock cam 9 in the direction opposite to the direction of arrow L. A spring (not shown) of the detent pin 3 has a stronger force than the spring 155, and thus when the shift lever 1 reaches the P range, the detent pin 3 rotates the lock cam 9 in the direction of arrow L up to a position illustrated in FIG. 17 while entering the U-shaped groove 9A.

As shown in FIG. 4, another end of the shift interlock wire 19 is led into the housing 21 in which the lock mechanism linked with the brake pedal 31 and the key device 39 is incorporated. When the vehicle is parked with the key 41 positioned at the LOCK position and also when the brake pedal 31 is not stepped on, the inner wire 142 is drawn in the housing 21 and locked. When the brake pedal 31 is stepped on by a predetermined quantity and also when the key 62 is rotated from the LOCK position to the ACC position (further to the engine start position as needed), the inner wire 142 is unlocked and becomes ready to be drawn out from the housing 21 toward the shift lever 1.

As shown in FIG. 21, in the shift lock apparatus according to the present embodiment, major dimensions of components thereof are determined so that dimension S between the groove 150 in the mounting metal cylinder 146 and the engagement metal piece 154 agrees with, the sum of RA and RB.

The procedure of mounting the shift interlock wire 19 on the side of the shift lever 1 will now be described.

First, the key 62 is inserted into the key device 39 and turned to the LOCK position, and the shift lever 1 is positioned at the P range.

Next, as shown in FIG. 21, the tip of the projection 138 of the bracket 130 is abutted on the lock cam 9. In this state, the screw 136 is driven into the detent plate 136 through the slot 135 to fix the bracket 130 on the detent plate 5.

Then, the groove 150 of the mounting metal cylinder 146 of the outer sheath 144 is fit into the groove 134 of the bracket 130, and also the engagement pin 128 of the lock cam 9 is inserted into the engagement hole 152 in the engagement metal piece 154 of the inner wire 142. Thus, the mounting metal cylinder 146 is fixed to the bracket 130, and the inner wire 142 is fixed to the lock cam 9.

With the shift lever 1 shifted to the P range, the position of the detent pin 3 in the vertical direction may vary by a very small dimension (0.2 to 1 mm for example) from vehicle to vehicle due to difference in individual adjustment.

According to a conventional practice, if the position of a detent pin varies, the distance between the engagement position of the tip of an inner wire (corresponding to the engagement pin 128 of the present embodiment) and the engagement position of the end portion of an outer sheath (corresponding to the groove 134 in the bracket 130 of the present embodiment) also varies, and consequently it is troublesome to adjust the mounting position of the end portion of the outer sheath. According to the present embodiment, however, adjustment is completed by fixing the bracket 130 with the screw 136 so that the tip of the projection 138 abuts on the lock cam 9, and consequently the shift interlock wire 19 can be mounted in a shorter period of time.

The operation of the shift lock apparatus will now be described.

In order to shift the shift lever 1 from the P range to another range, for example to the D range, the brake pedal 31 is stepped on, and also the key 41 is rotated from the LOCK position to the ACC position (further to an engine start position as needed).

This causes the inner wire 142 to become ready to move and the lock cam 9 to become rotatable. Then, by pressing the shift lever knob 17, the detent pin 3 is pressed down thereby to rotate the lock cam 9 in the unlocking direction. When locking is thus undone, the shift lever 1 becomes readily shiftable to any range.

Figure 22:
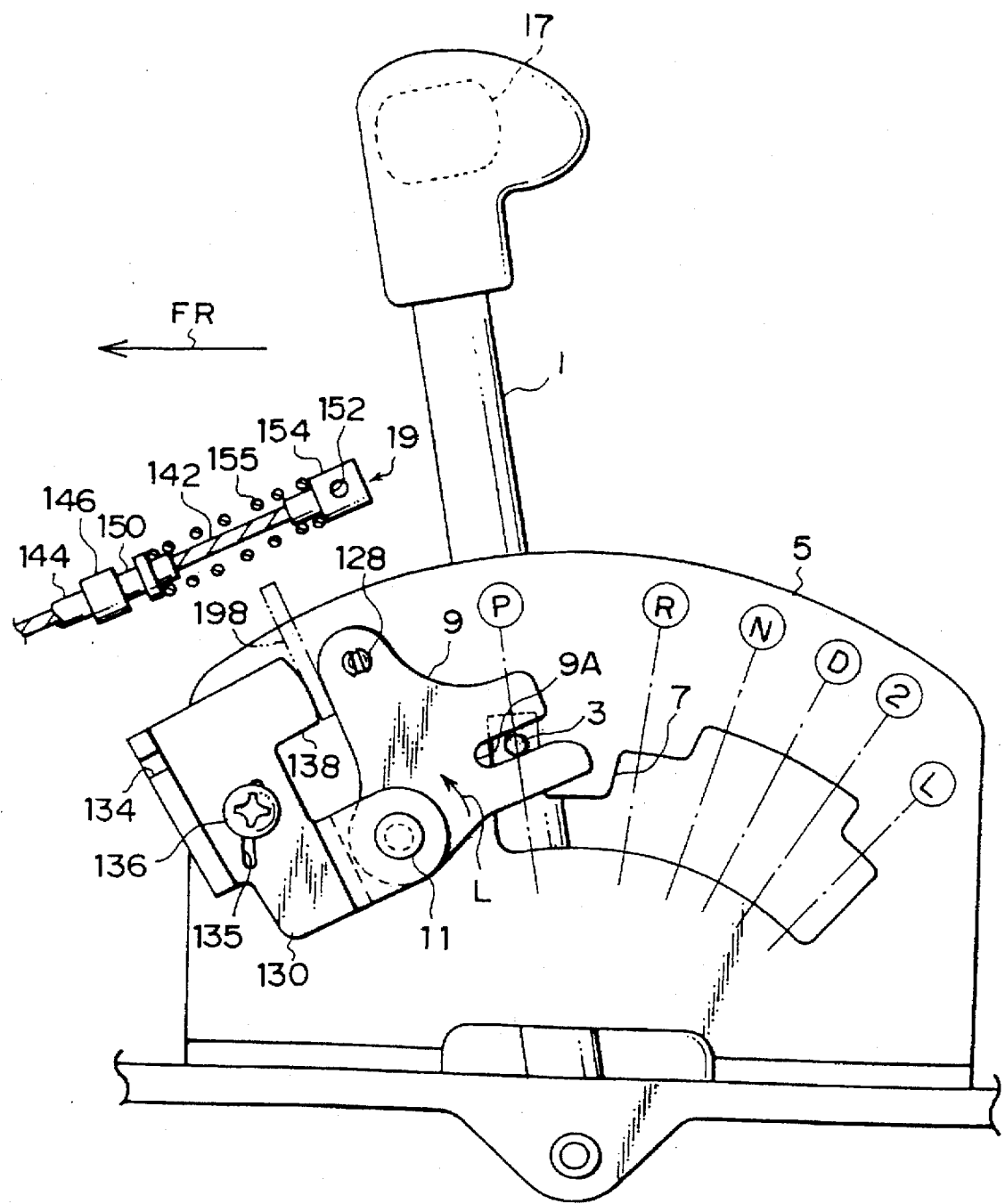
FIG. 22 is a side view of the shift lever and its periphery showing how the bracket is fixed using a jig.

Usually, the tip of the projection 138 of the bracket 130 is abutted on the lock cam 9, and the screw is driven into the detent plate 5 to fix the bracket 130 on the detent plate 5. However, when the shift interlock wire 19 is used in which the distance between the engagement hole 152 in the engagement metal piece 154 of the inner wire 142 and the groove 150 in the mounting metal cylinder 146 of the outer sheath 144 is longer than that defined in the present embodiment, a jig 198 may be inserted between the tip of the projection 138 of the bracket 130 and the lock cam 9 as shown in FIG. 22, and then the bracket 130 is fixed.

Seventh embodiment:

A seventh embodiment of the present invention will now be described.

According to the present embodiment, as in the aforesaid embodiments, the shift lever 1 cannot shift from the P range to another range unless the lock cam 9 rotates in the direction opposite to the direction of arrow L in FIG. 6 to an unlock position to permit the detent pin 3 to slip out of the U-shaped groove 9A. The lock cam 9 rotates to the lock position or the unlock position in an interlocking relation with the inner wire 142 of the shift interlock wire 19 connected to the lock cam 9. The inner wire 142 is sheathed with the outer sheath 144 and supported slidably.

Figure 23:
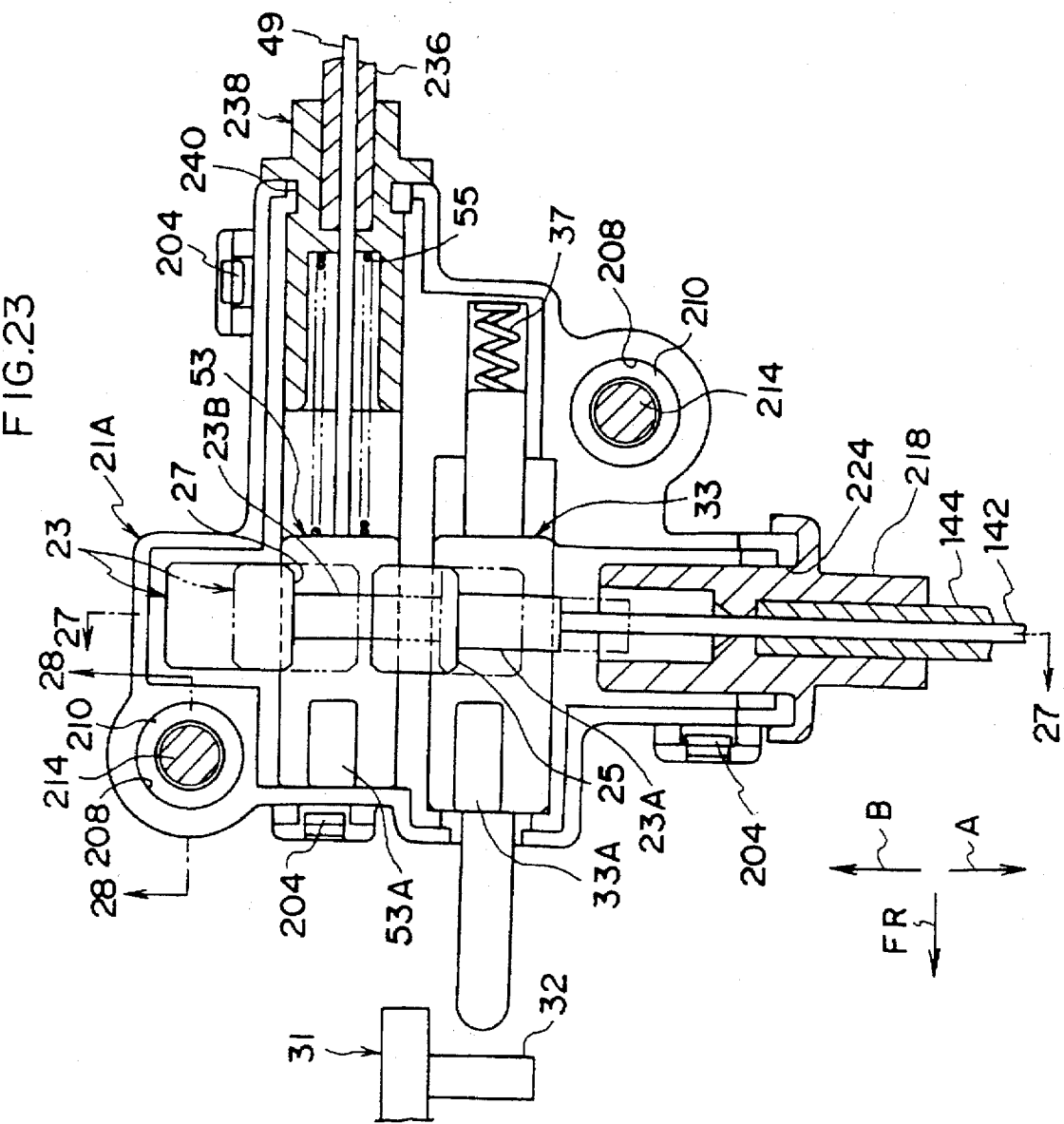
FIG. 23 is a horizontal cross-sectional view of a housing of an apparatus according to a seventh embodiment of the present invention.
Figure 27:
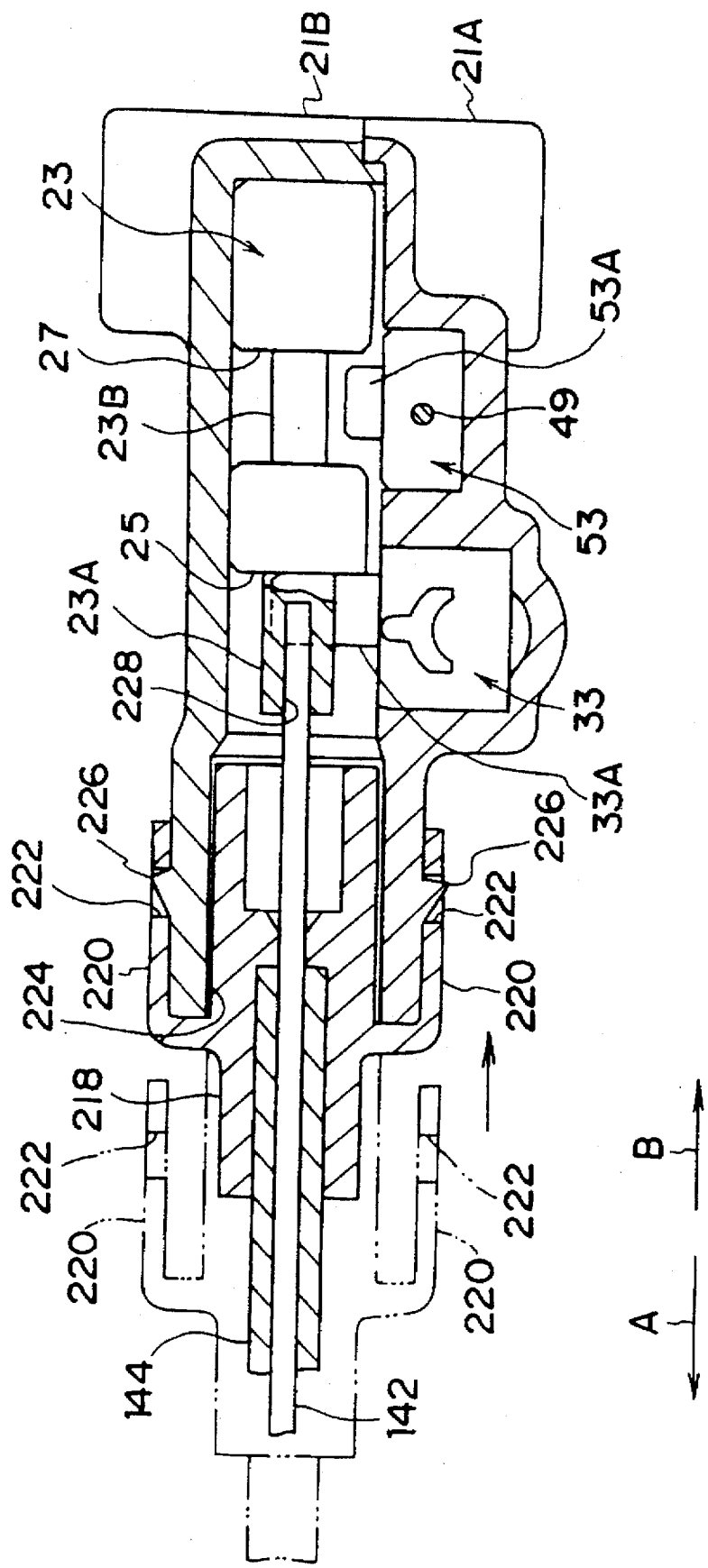
FIG. 27 is a cross-sectional view taken along line 27—27 in FIG. 23.

As shown in FIGS. 23 and 27, another end of the inner wire 142 is connected to the first slide member 23 within the housing 21, the first slide member 23 being an engagement member.

The first slide member 23 is housed in the housing 21 in such a manner that it can slide by a predetermined distance in either direction of arrow A and arrow B.

Figure 24:
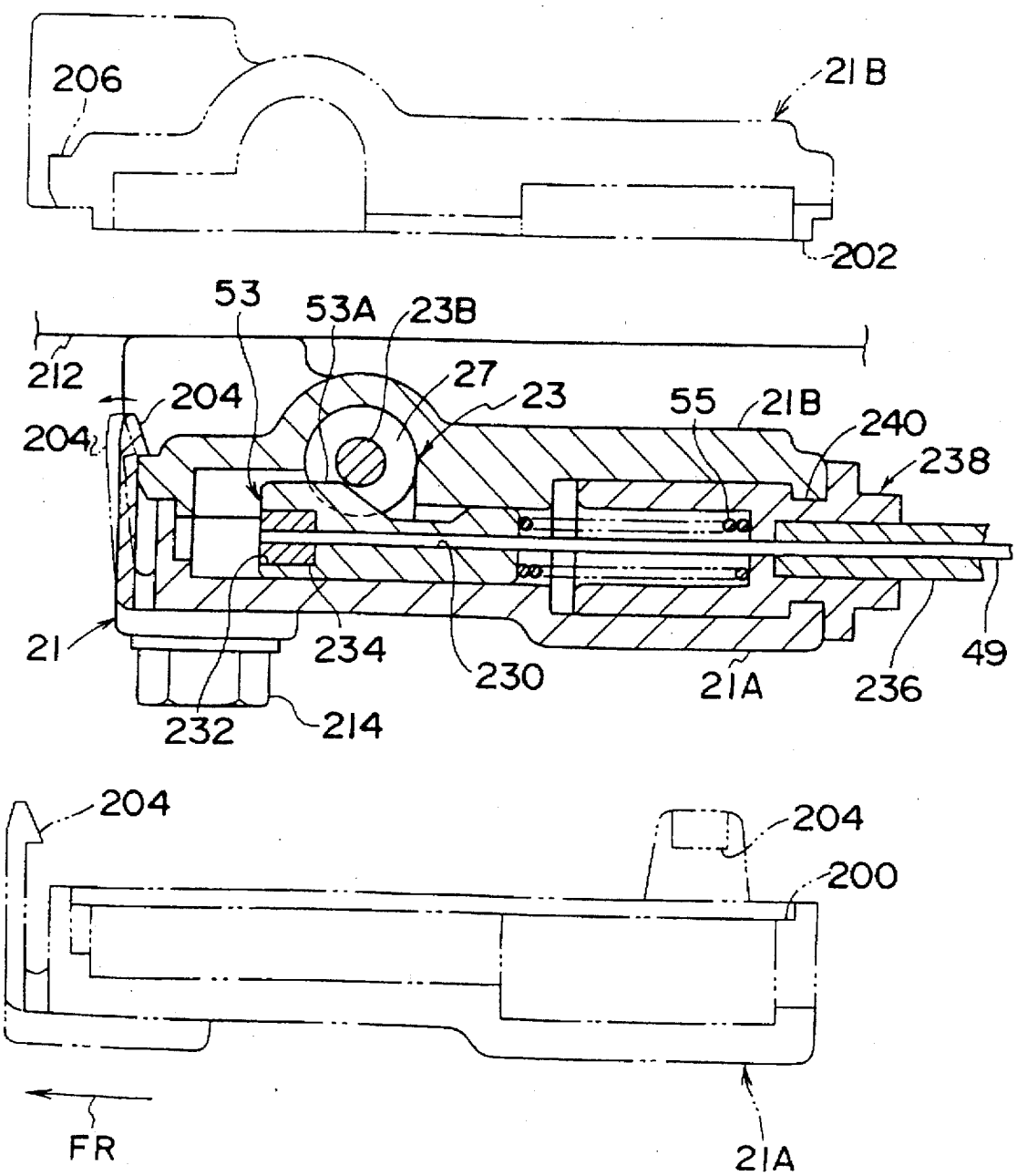
FIG. 24 is a cross-sectional view taken along line 24—24 in FIG. 26.

The housing 21 is a molding of synthetic resin and can be halved into a top housing 21A and a bottom housing 21B illustrated by a two-dots-and-dash line in FIG. 24. In the top housing 21A, a rabbet 200 is formed in the face of mating with the bottom housing 21B along the inner edge thereof. In the bottom housing 21B, a tongue 202 is formed on the face of mating with the top housing 21A. The tongue 202 fits into the rabbet 200 to join the top and bottom housings 21A and 21B together.

As shown in FIGS. 23 and 27, a cap 218, a molding of synthetic resin, is attached to another end of the outer sheath 144. A pair of mounting portions 220 are integrally formed with the cap 218, the mounting portions 220 being elastically deformable. A rectangular hole 222 is formed in each mounting portion 220.

A half of a mounting bore 224 is formed in each of the top housing 21A and the bottom housing 21B thereby to form the mounting bore 224 when the top and bottom housings 21A and 21B are joined together. A part of the cap 218 is inserted into the mounting bore 224. An engagement projection 226 having a triangular cross section is integrally formed with each of the top housing 21A and the bottom housing 21B. The engagement projection 226 anchors into the rectangular hole 222 in the mounting portion 220 when the cap 218 is inserted into the mounting bore 224.

As shown in FIGS. 23 and 24, the top housing 21A is provided with a plurality of hooks 204, and the bottom housing 21B is provided with a plurality of terraces 206, the hook 204 hooking to the terrace 206 for temporarily fixing the top and bottom housings 21A and 21B together.

Figure 28:
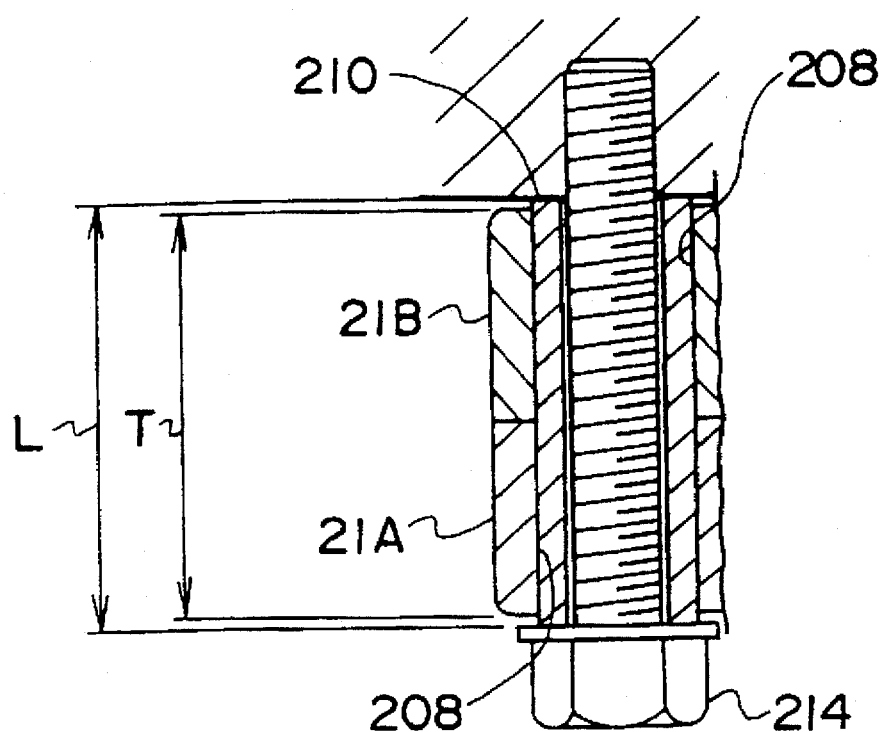
FIG. 28 is a cross-sectional view taken along line 28—28 in FIG. 23.

As shown in FIGS. 23 and 28, the top housing 21A and the bottom housing 21B are respectively provided with two bores 208 extending therethrough in the direction of thickness thereof. A collar 210 of a metallic pipe is inserted into the bore 208. A bolt 214 is inserted into the collar 210 to mount the housing 21 to the vehicle body 212. Length L of the collar 210 is slightly longer than thickness T of the housing 21 or is such that the housing 21 is slightly tightened, thereby preventing the tightened bolt 214 from getting loose.

As shown in FIGS. 23 and 24, the first slide member 23 has a circular cross section. A longitudinally intermediate portion of the first slide member 23 is reduced in diameter to form a small-diameter portion 23B, and the end portion of the first slide member 23 on the side of arrow A is also reduced in diameter to form a small-diameter portion 23A. The boundary end wall of the small-diameter portion 23A on the side of arrow B serves as a first engagement stopper wall 25. The boundary end wall of the small-diameter portion 23B on the side of arrow B serves as a second engagement stopper wall 27.

As shown in FIG. 27, a bore 228 having a predetermined depth is coaxially bored in the small-diameter portion 23A of the first slide member 23. Another end of the inner wire 142 is inserted into the bore 228 and then fixed by caulking.

Figure 25:
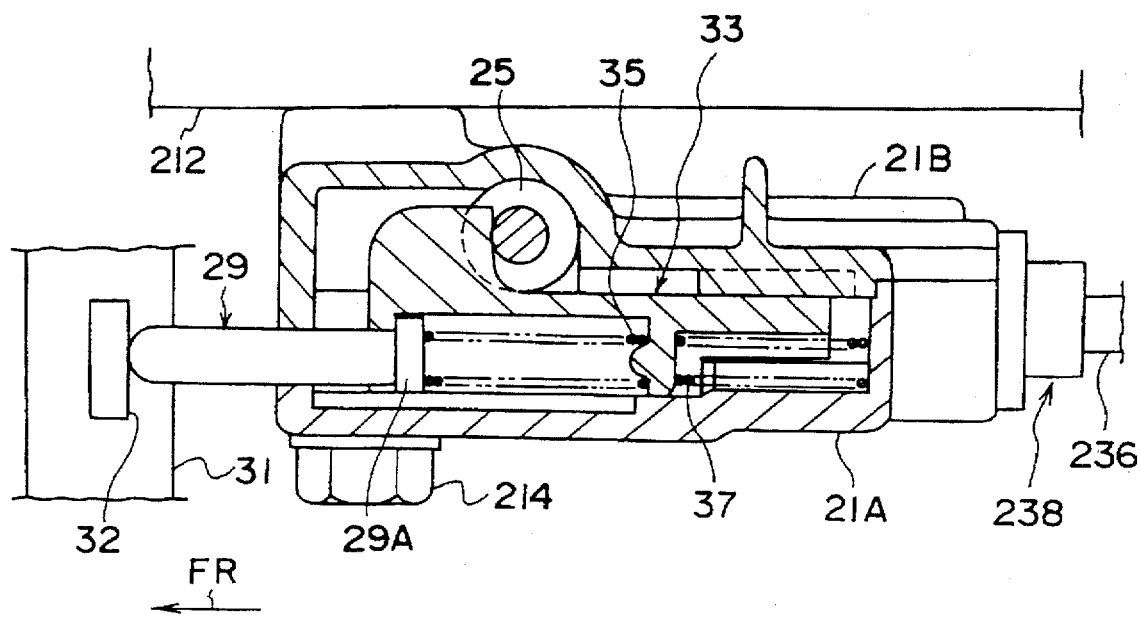
FIG. 25 is a cross-sectional view taken along line 25—25 in FIG. 26.

As shown in FIGS. 23 and 25, the slide pin 29 located at The side of the first slide member 23 projects through the side wall of the housing 21 toward the front of the vehicle. The slide pin 29 is provided opposite to the contact portion 32 fixed on the brake pedal 31 at an intermediate portion thereof.

A base portion including the flange 29A of the slide pin 29 is slidably housed in the lock pin 33 and biased in the direction of abutting on the contact portion 32 by the first spring 35 provided within the lock pin The lock pin 33 is housed in the housing 21 slidably by a predetermined dimension in the front-rear direction of the vehicle and biased by the second spring 37 in the direction of abutting on the contact portion 32.

A projection of the spring-biased slide pin 29 is limited by the flange 29A abutting on the inner wall of the lock pin 33. When the brake pedal 31 is stepped on, the brake pedal 31 moves in the forward direction of the vehicle, and consequently the contact portion 32 separates from the slide pin 29 as shown in FIG. 23.

As shown in FIG. 6, the inner wire 142 is biased toward the shift lever 1 by the return spring 13. When the detent pin 3 is positioned at other than the P range, the return spring 13 holds the lock cam 9 at its unlock position.

Figure 26:
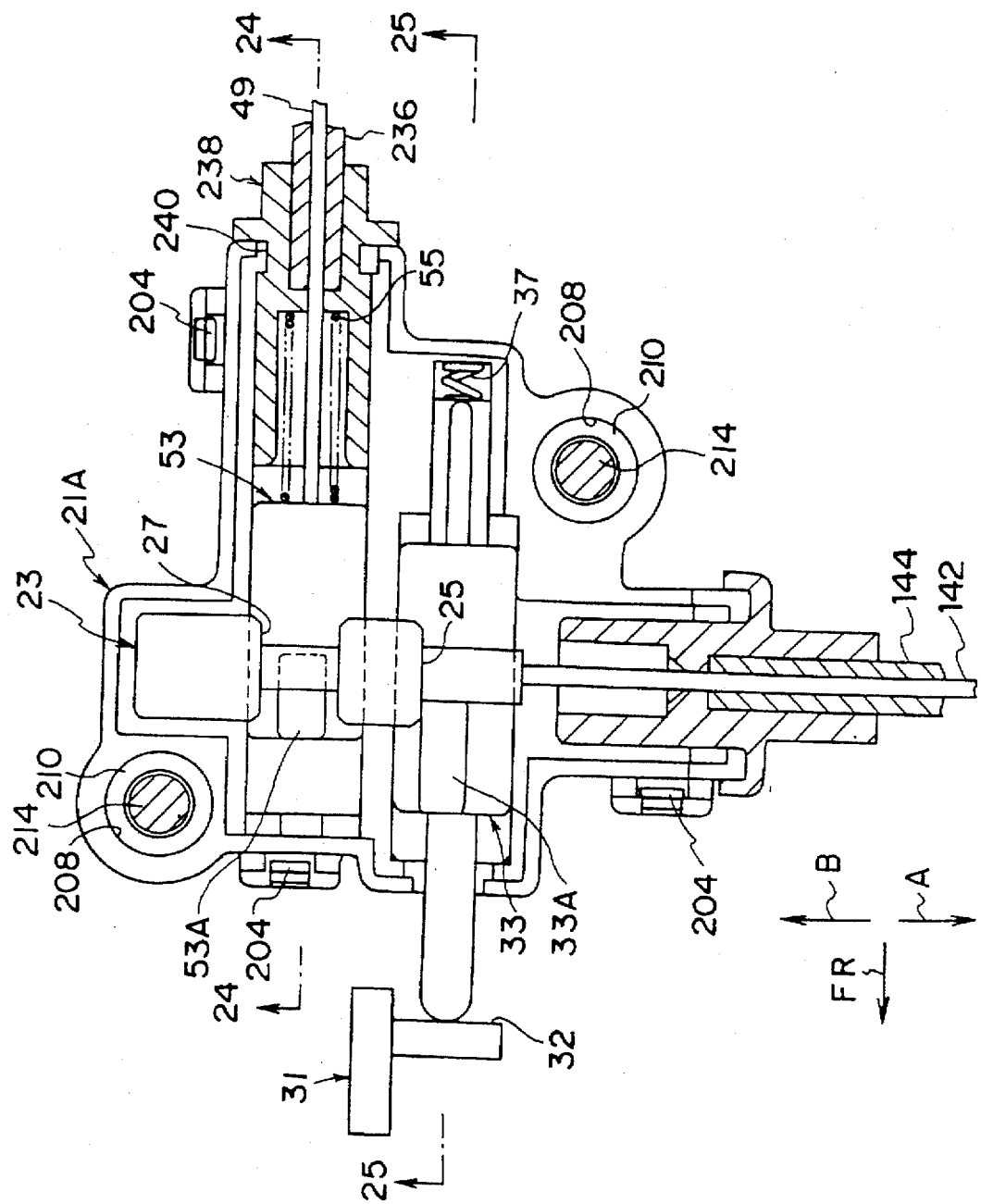
FIG. 26 is a view showing the operation of the apparatus shown in FIG. 23.

As shown in FIGS. 25 and 26, the lock pin 33 is provided with an engagement projection 33A or a lock member on the side of the vehicle's front, the engagement projection 33A being sized so as to anchor to the first engagement stopper wall 25.

As described above, the inner wire 142 is connected to the lock cam 9. When the lock cam 9 is positioned at its lock position, the first slide member 23 is positioned at its lock position as illustrated by a solid line in FIG. 23. When the lock cam 9 is positioned at its unlock position, the first slide member 23 is positioned at its unlock position as illustrated by a two-dots-and-dash line in FIG. 23.

As shown in FIG. 26, when the engagement projection 33A of the lock pin 33 anchors to the first engagement stopper wall 25, the inner wire 142 holds the lock cam 9 at its lock position shown in FIG. 6 against force of the return spring 13 (see FIG. 6). Thus, the detent pin 3 is prevented from lowering from the position shown in FIG. 6 even when the shift lever knob 17 is pressed.

As shown in FIG. 6, the return spring 13 applies a force to the lock cam 9 in the direction opposite to the direction of arrow L (clockwise). However, the return spring (not shown) of the detent pin 3 has a stronger force than the return spring 13, and hence the detent pin 3 rotates the lock cam 9 in the direction of arrow L to the position shown in FIG. 6 through the U-shaped groove 9A when the shift lever 1 reaches the P range.

In the key device 39 according to the present embodiment, as described in the section of the first embodiment (see FIG. 7), when the key 41 inserted into the key cylinder 43 is rotated from the ACC position to the LOCK position, the rotary movement of the cam 45 is transmitted to the pin 47 to pull the key interlock wire 49 toward the key device 39.

Another end of the key interlock wire 49 is led into the housing 21 and connected to the second slide member 53, as shown in FIGS. 23 and 24. The slide member 53 is housed in the housing 21 slidably by a predetermined dimension in the front-rear direction of the vehicle. A mounting metal piece 238 is fixed to an end of the outer sheath 236 to support the key interlock wire 49. A groove 240 is formed in the mounting metal piece 238, and the top housing 21A and the bottom housing 21B fit into the groove 240 to fix the mounting metal piece 238.

In the second slide member 53, a small-diameter through bore 230 is formed to allow the key interlock wire 49 to be inserted thereinto, and a large-diameter bore 232 is formed on the side of the vehicle's front. A cylindrical wire end 234 is caulked on the key interlock wire at another end thereof and inserted into the bore 232.

The second slide member 53 is provided with an engagement projection 53A or a lock member on the side of the vehicle's front, the engagement projection 53A being sized to be capable of intersecting the intermediate small-diameter portion 23B of the first slide member 23 thereby to anchor to the second engagement stopper wall 27. This anchorage is established with the first slide member 53 and the first slide member 23 intersecting substantially at right angles each other.

The engagement projection 53A becomes ready to intersect the small-diameter portion 23B when the first slide member 23 is positioned at its lock position (when the lock cam 9 is positioned at its lock position).

In FIG. 24, numeral 55 denotes a return spring which applies a force to the slide member 53 in the direction of arrow FR to slide the slide member 53 in the direction when the key 41 is rotated from the LOCK position to the ACC position.

The operation of the present embodiment will now be described.

In the state illustrated in FIG. 6, the shift lever 1 is positioned at the P range, and the lock cam 9 is positioned at its lock position. Accordingly, the inner wire 142 and the first slide member 23 are also positioned at their lock position.

In the parked state, the key is positioned at the LOCK position, and thus the second slide member 53 is engagement to the second engagement stopper wall 27 thereby to lock the first slide member 23. If the brake pedal 31 is not stepped on, the brake pedal 31 positioned at its original stop position presses the slide pin 29 in the direction opposite to the direction of arrow FR in FIG. 26. This pressing force presses the lock pin 33 through the first spring 35 and compresses the second spring 37 thereby to slide the lock pin 33 in the direction opposite to the direction of the brake pedal 31. Thus, the engagement projection 33A of the lock pin 33 anchors to the first engagement stopper wall 25. Accordingly, even when the shift lever knob 17 is pressed, the lock cam 9 does not rotate. The detent pin 3, therefore, cannot be pressed down thereby to disable the shift lever 1 from shifting to another range.

When the inner wire 142 and the first slide member 23 are positioned at their lock position, the second slide member 53 can freely engage with and disengage from the second engagement stopper wall 27 of the second slide member 53. The key 41 inserted into the key cylinder 43, therefore, can be rotated from the LOCK position to the ACC position and vice verse (see FIG. 7).

In order to shift the shift lever 1 from the P range to another range, for example to the D range, the brake pedal 31 is stepped on, and also the key 41 is rotated from the LOCK position to the ACC position (further to an engine start position as needed). This causes the lock pin 33 to disengage from the first engagement stopper wall 25 as shown in FIG. 23 and the second slide member 53 to disengage from the second engagement stopper wall 27. As a result, the inner wire 142 becomes ready to move, and the lock cam 9 becomes rotatable. Then, by pressing the shift lever knob 17, the detent pin 3 is pressed down thereby to rotate the lock cam 9 in the unlocking direction. When locking is thus undone, the shift lever 1 becomes readily shiftable to any range.

When the shift lever 1 has shifted to other than the P range, the first slide member 23 moves in the direction of arrow A as illustrated by a two-dots-and-dash line in FIG. 23. Thus, the engagement projections 33A and 53A are opposed to respective large-diameter portions of the first slide member 23.

In this case, when the brake pedal 31 is released, the slide pin 29 slides in the direction opposite to the direction of the brake pedal 31, the first spring 35 compresses, and the engagement projection 33A abuts on the large-diameter portion of the first slide member 23. The second spring 37 hardly compresses.

Since the engagement projection 53A cannot engage with the small-diameter portion 23B, the second slide member 53 and the key interlock wire 49 cannot move in the direction opposite to the direction of arrow FR. Thus, the key 41 cannot be rotated from the ACC position to the LOCK position.

When the shift lever 1 is returned to the P range thereby to cause the detent pin 3 biased by its return spring to rotate the detent cam 9 to its lock position, the inner wire 142 causes the first slide member 23 to return to its lock position illustrated in FIG. 26 thereby to allow the key 41 to be rotated to the LOCK position.

The present embodiment facilitates the attachment of the inner wire 142 and the outer sheath 144 on the part of the housing 21.

In detail, the outer sheath 144 can be attached to the housing 21 by inserting the cap 218 into the mounting bore 224 in the housing 21, i.e. by shifting the state illustrated in FIG. 27 by a two-dots-and-dash line to the state illustrated by a solid line. While the cap 218 is being inserted, the elastically deformable mounting portion 220 abuts on the triangular engagement projection 226 and then opens. When the engagement projection 226 reaches the position of engagement with the rectangular hole 222, the mounting portion 220 is elastically restored to engage the engagement projection 226 and the rectangular hole 222.

On the other hand, since the first slide member 23 is of a round bar, the attachment of the inner wire 142 does not involve directivity in orientation (an angular direction about an axis). Thus, the inner wire 142 can be easily set in the housing 21 simply by inserting the cap 218 of the outer sheath into the mounting bore 224.

The bottom housing 21B and the top housing 21A are assembled by means of a rabbet-and-tongue joint, and hence the housing 21 is protected from entry of foreign matter, thus providing good environmental resistance.

The first slide member 23 is prepared by lathing a round bar to coaxially form small-diameter portions and by coaxially boring the bore 228 therein for receiving the inner wire 142. The first slide member 23, therefore, can be mass-produced on an NC lathe or the like and is easier to machine than a conventional counterpart which is prepared from a prismatic member by partially providing cuts therein by milling or the like. Also, the first slide member 23 allows a higher efficiency of production (chamfering is troublesome for prismatic stock, but is easier for round stock).

Figure 29:
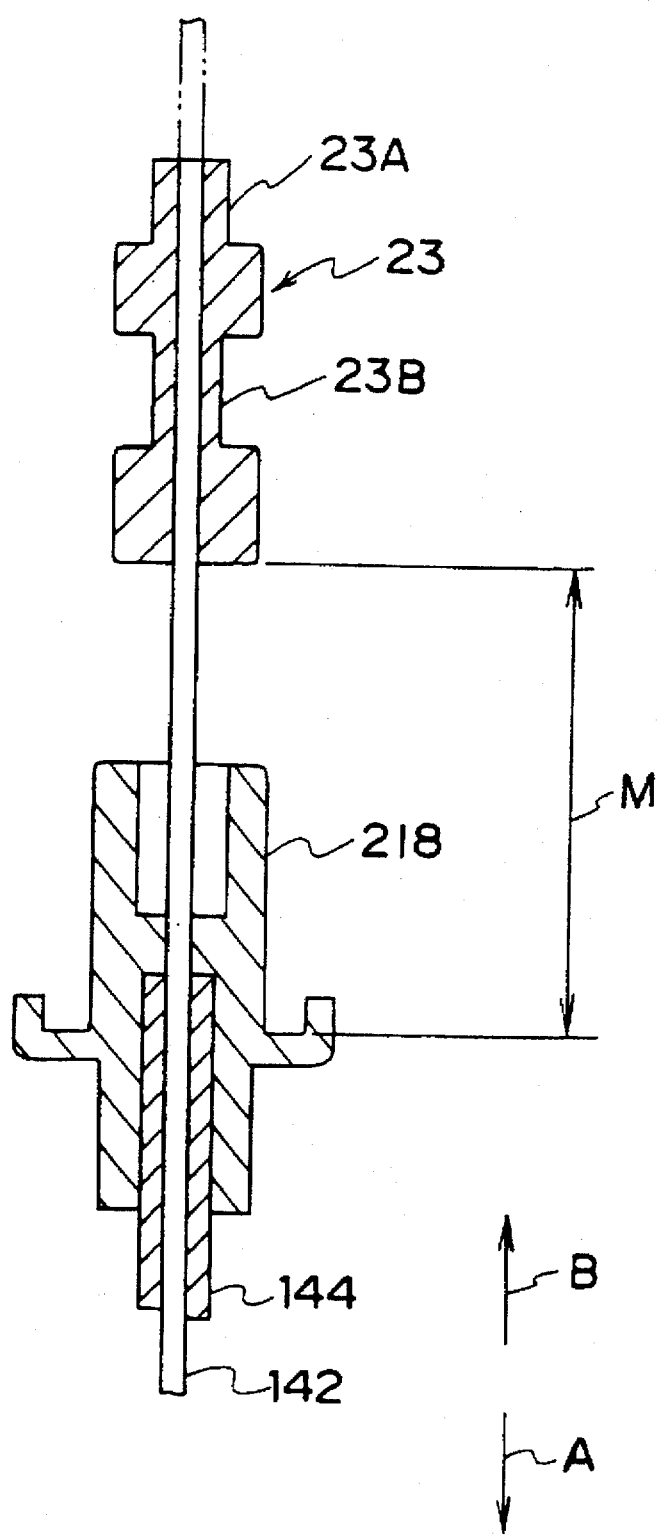
FIG. 29 shows another example of the first slide member.
Figure 30:
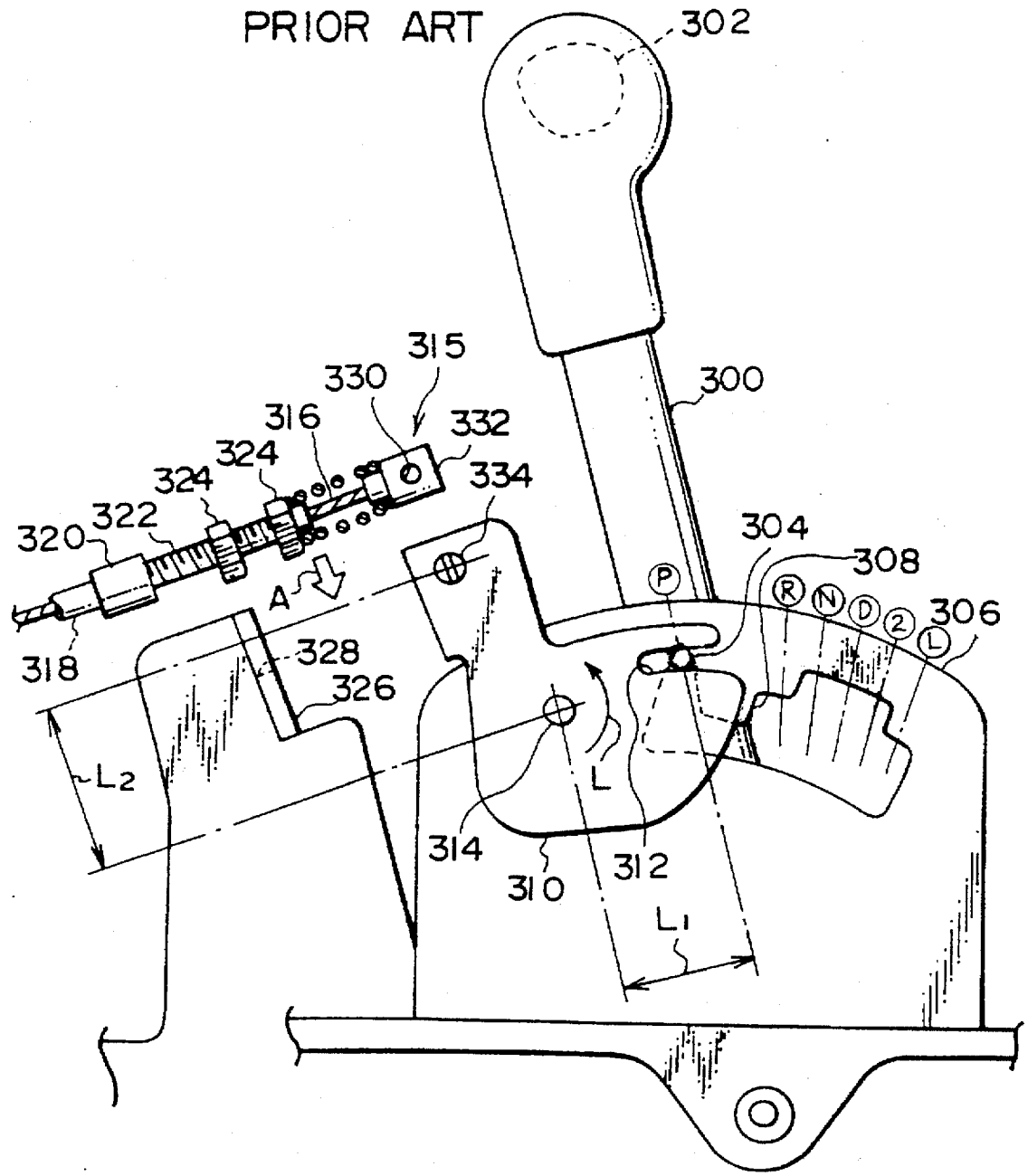
FIG. 30 is a side view of a shift lever and its periphery of a conventional shift lock apparatus.
Figure 31:
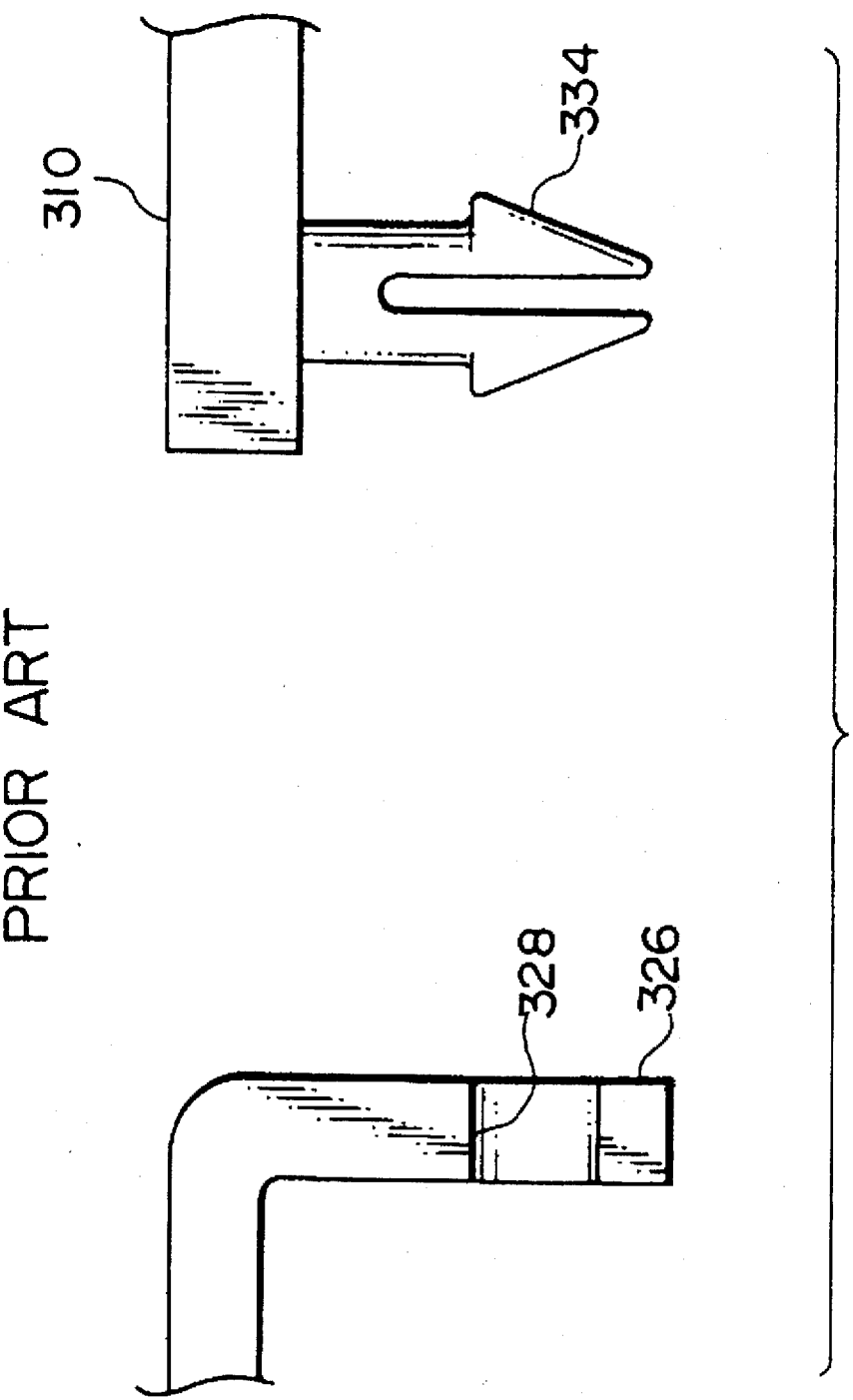
FIG. 31 is a view as viewed in the direction of arrow A in FIG. 30.

According to the seventh embodiment, the bore 228 of predetermined dimensions is bored into the small-diameter portion 23A of the first slide member 23, and another end of the inner wire 142 is inserted into the bore 228 and then caulked. However, as shown in FIG. 29, the inner wire 142 may be coaxially run through the first slide member 23, and another end of the inner wire 142 may be caulked at the small-diameter portion 23A provided on the opposite side of the seventh embodiment. In this case, the inner wire 142 is prepared somewhat longer than a required length. After determining distance M between a predetermined position on the cap 218 and a predetermined position on the first slide member 23 by the use of a jig or the like, the inner wire 142 is caulked, and an excess end thereof is cut off. Thus, the first slide member 23 can be disposed in the casing 21 at a fixed position with ease.

The aforesaid method of fixing the inner wire 142 by inserting an end thereof into the bore 228 requires a high precision of machining because the distance M varies depending on a tolerance of the depth of the hole 228 and of the length of the inner wire 142.

According to the seventh embodiment, the second slide member 53 or the lock pin 29 is arranged substantially perpendicular to the first slide member 23. However, they are not necessarily perpendicular to each other, but may intersect at a certain angle.

What is claimed is:

1. A mechanical shift lock apparatus used with a lock mechanism which mechanically locks a shift lever positioned at a parking range and unlocks the shift lever by a driver's special operation, said mechanical shift lock apparatus comprising:
   a shift interlock wire which is moved from a locked position to an unlocked position or to the contrary as said shift lever is mechanically locked or unlocked;
   a brake interlock member which is moved by a brake pedal;
   a key interlock member which is moved as a key inserted into a key cylinder is rotated from an ACC position to a LOCK position; and
   an engagement member connected to the shift interlock wire, and in a state in which the shift interlock wire is positioned at its locked position, the brake interlock member which is moved by the brake pedal which is at a released position intersects and engages the engagement member, and the key interlock member which is moved by the key being rotated to the LOCK position intersects and engages the engagement member.

2. A mechanical shift lock apparatus according to claim 1, wherein said engagement member, said brake interlock member and said key interlock member are housed in guide means so as to be slidable within said guide means, and are disposed at a position which is at a rear side of the brake pedal and at a front side of the key cylinder in a longitudinal direction of a vehicle.

3. A mechanical shift lock apparatus according to claim 2, wherein said engagement member comprises:
   a first engagement portion, and in a state in which the shift interlock wire is positioned at the lock position, said brake interlock member which is moved by the brake pedal which is at a released position intersects and engages said first engagement portion; and
   a second engagement portion, and in a state in which the shift interlock wire is positioned at the lock position, said key interlock member intersects and engages said second engagement portion.

4. A mechanical shift lock apparatus according to claim 2, wherein said shift interlock wire is introduced into said guide means from a side which is different from a side from which said brake interlock member and said key interlock member are introduced.

5. A mechanical shift lock apparatus according to claim 1, wherein said engagement member comprises:
   a first engagement portion, and in a state in which the shift interlock wire is positioned at the lock position, said brake interlock member which is moved by the brake pedal which is at a released position intersects and engages said first engagement portion; and
   a second engagement portion, and in a state in which the shift interlock wire is positioned at the lock position, said key interlock member intersects and engages said second engagement portion.

6. A mechanical shift lock apparatus according to claim 1, wherein said brake interlock member and said key interlock member are perpendicular to said engagement member connected to the shift interlock wire.

7. A mechanical shift lock apparatus according to claim 1, wherein said brake interlock member is urged by a spring and contacts the brake pedal when the brake is released.

8. A mechanical shift lock apparatus according to claim 1, wherein said key interlock member is connected by a key interlock wire to a key device having a key cylinder in which a key is inserted and is rotated from an ACC position to a LOCK position, and said shift interlock wire is connected to a shift lever device provided with a lock mechanism which mechanically locks the shift lever so that movement of the shift lever from a parking range position to another range position is prevented.

9. A mechanical shift lock apparatus according to claim 1, wherein said brake interlock member is formed integrally with said key interlock member.

10. A mechanical shift lock apparatus according to claim 1, further comprising:

a pair of electrical contacts which contact one another and separate from one another in accordance with movement of said brake interlock member.

11. A mechanical shift lock apparatus according to claim 10, wherein said engagement member, said brake interlock member and said key interlock member are housed in guide means so as to be slidable within said guide means, and are disposed at a rear position of the brake pedal, and are disposed at a position which is at a rear side of the brake pedal and at a front side of the key cylinder in a longitudinal direction of the vehicle.

12. A mechanical shift lock apparatus according to claim 10, wherein a pin member which contacts said brake pedal is attached to said brake interlock member such that the amount of projection of said pin member from said brake interlock member is adjustable.

13. A mechanical shift lock apparatus according to claim 10, wherein said brake interlock member and said key interlock member are perpendicular to said engagement member connected to the shift interlock wire.

14. A lock mechanism for mechanical shift lock comprising:

a shift interlock wire which is moved from a locked position to an unlocked position or to the contrary as said shift lever is mechanically locked or unlocked;

a brake interlock member which is moved by a brake pedal;

a key interlock member which is moved as a key inserted into a key cylinder is rotated from an ACC position to a LOCK position;

an engagement member connected to the shift interlock wire, and in a state in which the shift interlock wire is positioned at its locked position, the brake interlock member which is moved by the brake pedal which is at a released position intersects and engages said engagement member, and said key interlock member which is moved by the key being rotated to the LOCK position intersects and engages said engagement member.

15. A lock mechanism according to claim 14, further comprising:

a pair of electrical contacts which contact one another and separate from one another in accordance with movement of said brake interlock member.

* * * * *